United States Patent
DesLauriers et al.

(10) Patent No.: US 11,773,198 B2
(45) Date of Patent: Oct. 3, 2023

(54) POLYOLEFIN PROCESS MONITORING AND CONTROL

(71) Applicant: Chevron Phillips Chemical Company LP, The Woodlands, TX (US)

(72) Inventors: Paul J. DesLauriers, Owasso, OK (US); Jeff S. Fodor, Bartlesville, OK (US); Eric J. Netemeyer, Bartlesville, OK (US); Qing Yang, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/931,103

(22) Filed: Sep. 9, 2022

(65) Prior Publication Data
US 2023/0183402 A1    Jun. 15, 2023

Related U.S. Application Data

(63) Continuation of application No. 16/386,794, filed on Apr. 17, 2019, now Pat. No. 11,453,733.

(51) Int. Cl.
*C08F 210/16*    (2006.01)
*C08F 2/00*    (2006.01)

(52) U.S. Cl.
CPC ........ *C08F 210/16* (2013.01); *C08F 2400/02* (2013.01)

(58) Field of Classification Search
None
See application file for complete search history.

(56) References Cited

U.S. PATENT DOCUMENTS

| | | |
|---|---|---|
| 8,048,679 B2 | 11/2011 | Deslauriers |
| 8,940,842 B2 | 1/2015 | Yang |
| 2013/0319131 A1 | 12/2013 | Inn |

OTHER PUBLICATIONS

Christos Tsenoglou, "Molecular Weight Polydispersity Effects on the Viscoelasticity of Entagled Linear Polymers," A, American Chemical Society, Macromolecules, 24; 1991; pp. 1762-1767.
Edita Mastan, et al., "Methods of Moments: A Versatile Tool for Deterministic Modeling of Polymerization Kinetics," Elsevier, European Polymer Journal, 68; 2015; pp. 139-160.
(Continued)

*Primary Examiner* — Fred M Teskin
(74) *Attorney, Agent, or Firm* — Eversheds Sutherland (US) LLP

(57) ABSTRACT

Methods of controlling olefin polymerization reactor systems may include a) selecting n input variables, each input variable corresponding to a process condition for an olefin polymerization process; b) identifying m response variables corresponding to a measurable polymer property; c) adjusting one of more of the n input variables using the olefin polymerization reactor system and measuring each of the m response variables as a function of the input variables for olefin polymers; d) analyzing the change in each of the response variables as a function of the input variables to determine coefficients; e) calculating a Response Surface Model (RSM) for each response variable determined in step d); f) applying n selected input variables to the calculated RSM to predict one or more of m target response variables; and g) using the n selected input variables to operate the olefin polymerization reactor system and provide a polyolefin product.

44 Claims, 3 Drawing Sheets

(56) References Cited

OTHER PUBLICATIONS

International Search Report and Written Opinion issued in corresponding application No. PCT/US20/27349 dated Sep. 1, 2020, 13 pages.
IUPAC Compendium of Chemical Terminology, 2nd Ed. 1997, pp. 1-1670.
J. des Cloizeaux, "Relaxation and Viscosity Anomaly of Melts Made of Long Entangled Polymers Time-Dependent Reptation," American Chemical Society, Macromolecules, 23; 1990; pp. 4678-4687.
Jeffrey S. Fodor, Thesis: Application of Normal-Mode Microdielectrometry Towards Investigation of Diffusion and Flow-Induced Phenomena in Polymer Melts, Notre Dame, IN: University of Notre Dame, 1995, pp. 1-282.
Jeffrey S. Fodor, et al., "Dielectric and Viscoelastic Normal-Mode Relaxation in Entangled, Polydisperse Cis-Polyisoprene Melts," The Journal of Chemical Physics, vol. 103, No. 13, 1995; pp. 5725-5734.
Michael Rubinstein, et al., "Self-Consistent Theory of Polydisperse Entangled Polymers: Linear Viscoelasticity of Binary Blends," The Journal of Chemical Physics, vol. 89, No. 8; 1988; pp. 5291-5306.
Nikolai Klebanov, et al. "Dynamic Response Surface Models: A Data-Driven Approach for the Analysis of Time-Varying Process Outputs," Industrial & Engineering Chemistry Research, vol. 55, No. 14, Mar. 13, 2016, pp. 4022-4034, XP055706778, ISSN: 0888-5885, DOI: 10.1021/acs.iecr.5b03572,1. Introduction; 2. The Dynamic REsponse Surface Model (DRSM) Methodology; 4. Batch Reactor With Single Reversible Reaction; 7. Potential Usages of the DRSM.
Paul J. DesLauriers, et al., "Mapping the Structure-Property Space of Bimodal Polyethylenes Using Response Surface Methods. Part 1: Digital Data Investigation," Advanced Science News, Macromol. React. Eng., Bimodal Polyethylenes, Wiley-VCH; pp. 1-14.
S. H. Wasserman, et al., "Effects of Polydispersity On Linear Viscoelasticity in Entangled Polymer Melts," Journal of Rheology, vol. 36, No. 2; 1992; pp. 543-572.

POLYOLEFIN PROCESS MONITORING AND CONTROL

CROSS-REFERENCE TO RELATED APPLICATIONS

The present application is a continuation of U.S. patent application Ser. No. 16/386,794, filed Apr. 17, 2019, which is incorporated herein by reference in its entirety.

TECHNICAL FIELD OF THE DISCLOSURE

This application relates to systems and methods for improved reactor control, in particular systems and methods for improved control of polyolefin reactors.

BACKGROUND

Polyolefin properties depend on a number of factors, such as reactor temperature, reaction time, average residence time, olefin concentration, α-olefin comonomer concentration, hydrogen concentration, catalyst type, catalyst concentration, co-catalyst concentration, activator concentration, reactor configuration, reactor volume, and the like. Determining the necessary conditions to produce a polyolefin having desired properties typically requires time and cost-intensive repeated testing to determine whether any particular combination of properties will yield the desired polyolefin properties.

As the complexity of the resins produced and the complexity of the processes to manufacture them have increased, there is an parallel need for a more advanced systematic method of process control. Determining the key process parameters to monitor and control becomes increasingly difficult when the desired polyolefin is a bimodal polyolefin, and when more than one reactor is being used. Bimodal polyolefins with reverse comonomer composition distribution (CCD) have excellent mechanical properties, but are often particular difficult to determine manufacturing.

Accordingly, improved systems and methods for reactor control are needed.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

In an aspect, the disclosed processes are applicable to bimodal resins produced in a single reactor utilizing a dual catalyst system, in which the production of two distinct polymers in one reactor renders the characterization of each individual polymer extremely difficult. While simple systems can use melt flow and density to control a polymerization process to the targeted molecular weight distribution, the current disclosure provides methods based upon process sample GPC (gel permeation chromatography), SCB (short chain branching) analysis and dynamic rheology.

In one aspect, this disclosure provides methods based on dynamic rheology and rapid GPC to determine what process conditions to adjust to produce the targeted molecular weight distribution for dual catalyst systems in a single reactor, for example, a dual metallocene catalyst system in a single reactor. The methods were developed to input a target rheology-frequency scan and/or a rapid GPC of the desired polymer. The rheology and MWD obtained from a current process sample was input into the disclosed method at regular intervals. The method would then correlate a designed experimental model, for example a model obtained using previously collected pilot plant data, with the current reaction process conditions. Any minor corrections or offsets can be added to match the current process to the current sample. The method would then compare the current rheology and MWD to the target, calculate a trajectory, translate that trajectory to a change in reactor control parameters. In an aspect, for example, the method could provide a suggestion for new control set points in reactor conditions. These steps would be repeated until the process sample rheology and MWD matched the target polymer rheology and MWD.

In one aspect, for the single reactor dual catalyst system, while some key reactor conditions can be held constant, the $H_2$ (hydrogen pressure), temperature, and co-monomer (for example, hexane) can be varied using the disclosed method to obtain a target resin. The same basis methodology is applicable in other resin processes, for example, the Advanced Dual Loop (ADL) process, although a different combination of key and manipulated parameters can be used. Therefore, this model development entails using data collected in a systematic fashion along with mathematical modeling on the systems to be controlled.

According to an aspect, this disclosure provides a method of controlling an olefin polymerization reactor system, the method including: a) selecting n input variables $I^1$, $I^2$, $I^3$, ... $I^n$, each input variable corresponding to a process condition for an olefin polymerization process; b) identifying m response variables, $R^1$, $R^2$, $R^3$, ... $R^m$, each response variable corresponding to a measurable polymer property, wherein two of the m response variables are molecular weight distribution (MWD) and short chain branching (SCB); c) adjusting one of more of the n input variables $I^1$ to $I^n$ in a plurality of polymerization reactions using the olefin polymerization reactor system, to provide a plurality of olefin polymers and measuring each of the m response variables $R^1$ to $R^m$ as a function of the input variables for each olefin polymer; d) analyzing the change in each of the response variables $R^1$ to $R^m$ as a function of the input variables $I^1$ to $I^n$ to determine the coefficients according to the following general equation for each response variable $R^1$ to $R^m$:

$$R^{1-m} = C^0 + \sum_{u=1}^{u=n} C^u(I^u)$$

e) calculating a Response Surface Model (RSM) using general equations for each response variable $R^1$ to $R^m$ ($R^{1-m}$) determined in step d) to correlate any combination of the n input variables $I^1$ to $I^n$ with one or more of m response variables $R^1$ to $R^m$; f) applying n selected input variables $I^{s1}$, $I^{s2}$, $I^{s3}$, ... $I^{sn}$ to the calculated Response Surface Model (RSM) to predict one or more of m target response variables, $R^{t1}$, $R^{t2}$, $R^{t3}$, ... $R^{tm}$, each target response variable corresponding to a measurable polymer property; and g) using the n selected input variables $I^{s1}$ to $I^{sn}$ to operate the olefin polymerization reactor system and provide a polyolefin product.

According to some aspects, the general equation for each response variable $R^1$ to $R^m$ is $$R^{1-m} = C^0 + \sum_{u=1}^{u=n} C^u(I^u) + \sum_{v=1}^{v'} C^v(\text{product of a unique combination of 2 of } I^1 \text{ to } I^n,$$

independently selected)

wherein v' is the total number of unique combinations of any 2 of $I^1$ to $I^n$, independently selected.

According to some aspects, the general equation for each response variable $R^1$ to $R^m$ is $$R^{1-m} = C^0 + \sum_{u=1}^{u=n} C^u(I^u) + \sum_{v=1}^{v'} C^v(\text{product of a unique combination of 2 of } I^1 \text{ to } I^n,$$

independently selected) +

$$\sum_{w=1}^{w'} C^w(\text{product of a unique combination of 3 of } I^1 \text{ to } I^n,$$

independently selected)

wherein v' is the total number of unique combinations of any 2 of $I^1$ to $I^n$, independently selected; and w' is the total number of unique combinations of any 3 of $I^1$ to $I^n$, independently selected.

According to some aspects, the general equation for each response variable $R^1$ to $R^m$ is $$R^{1-m} = C^0 + \sum_{u=1}^{u=n} C^u(I^u) + \sum_{v=1}^{v'} C^v(\text{product of a unique combination of 2 of } I^1 \text{ to } I^n,$$

independently selected) +

$$\sum_{w=1}^{w'} C^w(\text{product of a unique combination of 3 of } I^1 \text{ to } I^n,$$

independently selected) +

$$\sum_{k=1}^{x'} C^x(\text{product of a unique combination of 4 of } I^1 \text{ to } I^n,$$

independently selected)

wherein v' is the total number of unique combinations of any 2 of $I^1$ to $I^n$, independently selected; w' is the total number of unique combinations of any 3 of $I^1$ to $I^n$, independently selected; and x' is the total number of unique combinations of any 4 of $I^1$ to $I^n$, independently selected.

According to another aspect, this disclosure provides a method of controlling an olefin polymerization reactor system, the method comprising: a) selecting one or more of m target response variables, $R^{t1}$, $R^{t2}$, $R^{t3}$, ... $R^{tm}$, each target response variable corresponding to a measurable polymer property; b) calculating n selected input variables $I^{s1}$, $I^{s2}$, $I^{s3}$, ... $I^{sn}$ using the Response Surface Model (RSM) of claim 1, to achieve the one or more of m target response variables, $R^{t1}$, $R^{t2}$, $R^{t3}$, ... $R^{tm}$; c) using the n selected input variables $I^{s1}$ to $I^{sn}$ to operate the olefin polymerization reactor system and provide a polyolefin product; d) measuring one or more properties of the polyolefin product corresponding to m measured response variables, $R^{m1}$, $R^{m2}$, $R^{m3}$, ... $R^{mm}$; and e) repeating steps a) through d) to reduce the difference between the target response variables $R^{t1}$ to $R^{tm}$ and the measured response variables $R^{m1}$ to $R^{mm}$.

These and other aspects and embodiments according to this disclosure are provided in the drawings, detailed description and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures form part of the present specification and are included to further demonstrate certain aspects of the present disclosure. The invention may be better understood by reference to one or more of these figures in combination with the detailed description of specific aspects presented herein.

Figure 1:
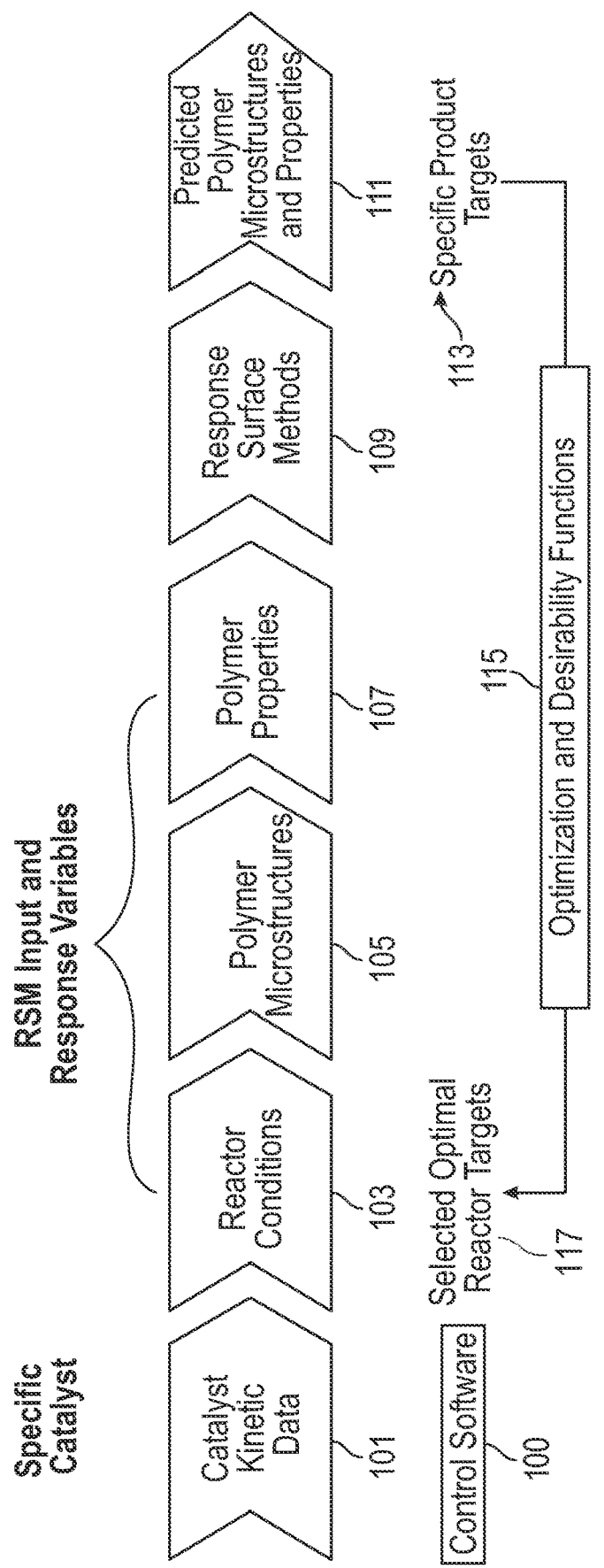
FIG. 1 illustrates a schematic overview of a forward optimization model using a response surface model according to an embodiment of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs, and unless otherwise indicated or the context requires otherwise, these definitions are applicable throughout this disclosure. Further, unless otherwise required by context, singular terms shall include pluralities and plural terms shall include the singular. For example, if a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Unless explicitly stated otherwise in defined circumstances, all percentages, parts, ratios, and like amounts used herein are defined by weight.

Further, in this connection, certain features of the invention which are, for clarity, described herein in the context of separate aspects, may also be provided in combination in a single aspect. Conversely, various features of the invention that are, for brevity, described in the context of a single aspect, may also be provided separately or in any subcombination.

Regarding claim transitional terms or phrases, the transitional term "comprising", which is synonymous with "including", "containing", or "characterized by" is inclusive or open-ended and does not exclude additional, un-recited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to the feature class to which is utilized and it is possible to have different transitional terms or phrases utilized with different features within a claim. For example, a method can comprise several recited steps (and other non-recited steps) but utilize a catalyst system preparation consisting of specific steps and utilize a catalyst system comprising recited components and other non-recited components. While compositions and methods are described in terms of "comprising" various components or steps, the compositions and methods can also "consist essentially of" or "consist of" the various components or steps.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

"Optional" or "optionally" means that the subsequently described event or circumstance can or cannot occur, and that the description includes instances where the event or circumstance occurs and instances where it does not.

The terms "configured for use" or "adapted for use" and similar language is used herein to reflect that the particular recited structure or procedure is used in a system or process as disclosed herein. For example, unless otherwise specified, a particular structure "configured for use" means it is "configured for use in a reactor system", including for example, "configured for use in an olefin polymerization reactor system" and therefore is designed, shaped, arranged, constructed, and/or tailored to effect olefin polymerization, as would have been understood by the skilled person.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins.

The terms "polyolefin" or "polymer" as used herein means a substance produced by polymerization of one or more olefins, alone or in combination with suitable comonomers, catalysts, or additives. For example, a "polyolefin" or "polymer" as used herein may be produced with a chromium catalyst, a metallocene catalyst, including a dual metallocene catalyst, a Ziegler-Natta catalyst, or combinations thereof. A "polyolefin" or "polymer" as used herein may be produced in a single reactor, or in a plurality of reactors in series or parallel. A "polyolefin" or "polymer" as used herein may be a monomodal or multimodal polymer.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, or within 5% of the reported numerical value, or within 2% of the reported numerical value.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial aspect of the inventions are described or shown for the sake of clarity and understanding. Persons of skill in this art will also appreciate that the development of an actual commercial aspect incorporating aspects of the present inventions will require numerous implementation-specific decisions to achieve the developer's ultimate goal for the commercial aspect. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It is to be understood that the inventions disclosed and taught herein are susceptible to numerous and various modifications and alternative forms. Lastly, the use of a singular term, such as, but not limited to, "a," is not intended as limiting of the number of items.

According to an aspect, this disclosure provides a method of monitoring and controlling a multisite catalyst in a single or multiple reactor system to produce a particular desired product structure and its resulting polymer properties, as illustrated in FIG. 1. In some embodiments, these methods allow for more efficient reactor startups and reactor adjustments by optimizing for the most desirable possible reactor conditions to produce a polymer product with reselected specific targets, thereby reducing off-spec material and maximizing reactor efficiency. In addition to product specifications, reactor specifications such as percent solids and yield can be optimized by incorporating these parameters as response variables. The primary advantage of this invention is that multiple response variables can be optimized simultaneously thereby allowing the optimal operation space for a particular specified product.

According to an aspect, this disclosure provides a method for a systematic approach to a target resin in a more rapid and efficient fashion that conventional methods. For example, the target resin and the final product can be better defined according to a broader range of characterization parameters. For example, rather than requiring only properties such as melt index (MI) and density to match the target resin, the entire MWD, rheology frequency scan, SCB distribution and/or LCB content can be targeted. In an aspect, the method utilizes more informative polymer characterization techniques to the in-process samples to achieve a more rapid and efficient approach to a target resin.

In one aspect, a method of controlling an olefin polymerization reactor system is provided including: First, a) selecting n input variables $I^1$, $I^2$, $I^3$, ... $I^n$, each input variable corresponding to a process condition for an olefin polymerization process; and b) identifying m response variables, $R^1$, $R^2$, $R^3$, ... $R^m$, each response variable corresponding to a measurable polymer property, wherein two of the m response variables are molecular weight distribution ("MWD") and short chain branching ("SCB"). For example, in some embodiments the input variables may include reactor temperature, reaction time, average residence time, olefin concentration, α-olefin comonomer concentration, hydrogen concentration, catalyst type, catalyst concentration, co-catalyst concentration, activator concentration, reactor configuration, reactor volume, or any combination thereof. For example, in some embodiments the polyolefin is polyethylene and the olefin is ethylene.

In some embodiments, the method further includes c) adjusting one of more of the n input variables $I^1$ to $I^n$ in a plurality of polymerization reactions using the olefin polymerization reactor system, to provide a plurality of olefin polymers and measuring each of the m response variables $R^1$ to $R^m$ as a function of the input variables for each olefin polymer; d) analyzing the change in each of the response variables $R^1$ to $R^m$ as a function of the input variables $I^1$ to $I^n$ to determine the coefficients according to the following general equation for each response variable $R^1$ to $R^m$:

$$R^{1-m} = C^0 + \sum\nolimits_{u=1}^{u=n} C^u(I^u)$$

In some embodiments, the general equation for each response variable $R^1$ to $R^m$ is $$R^{1-m} = C^0 + \sum\nolimits_{u=1}^{u=n} C^u(I^u) +$$
$$\sum\nolimits_{v=1}^{v'} C^v(\text{product of a unique combination of 2 of } I^1 \text{ to } I^n,$$
$$\text{independently selected})$$

wherein v' is the total number of unique combinations of any 2 of $I^1$ to $I^n$, independently selected.

In some embodiments, the general equation for each response variable $R^1$ to $R^m$ is $$R^{1-m} = C^0 + \sum\nolimits_{u=1}^{u=n} C^u(I^u) + \sum\nolimits_{v=1}^{v'} C^v(\text{product of}$$
$$\text{a unique combination of 2 of } I^1 \text{ to } I^n,$$
$$\text{independently selected}) + \sum\nolimits_{w=1}^{w'} C^w(\text{product of}$$
$$\text{a unique combination of 3 of } I^1 \text{ to } I^n, \text{ independently selected})$$

wherein v' is the total number of unique combinations of any 2 of $I^1$ to $I^n$, independently selected; and w' is the total number of unique combinations of any 3 of $I^1$ to $I^n$, independently selected.

In some embodiments, the general equation for each response variable $R^1$ to $R^m$ is $$R^{1-m} = C^0 + \sum\nolimits_{u=1}^{u=n} C^u(I^u) + \sum\nolimits_{v=1}^{v'} C^v(\text{product of}$$
$$\text{a unique combination of 2 of } I^1 \text{ to } I^n,$$
$$\text{independently selected}) + \sum\nolimits_{w=1}^{w'} C^w(\text{product of}$$
$$\text{a unique combination of 3 of } I^1 \text{ to } I^n,$$
$$\text{independently selected}) + \sum\nolimits_{x=1}^{x'} C^x(\text{product of}$$
$$\text{a unique combination of 4 of } I^1 \text{ to } I^n, \text{ independently selected});$$

wherein v' is the total number of unique combinations of any 2 of $I^1$ to $I^n$, independently selected; w' is the total number of unique combinations of any 3 of $I^1$ to $I^n$, independently selected; and x' is the total number of unique combinations of any 4 of $I^1$ to $I^n$, independently selected.

In some embodiments, the general equation for each response variable $R^1$ to $R^m$ may be expanded to the unique combinations of n number of $I^1$ to $I^n$, independently selected.

In some embodiments, the method further includes e) calculating a Response Surface Model (RSM) using general equations for each response variable $R^1$ to $R^m$ ($R^{1-m}$) determined in step d) to correlate any combination of the n input variables $I^1$ to $I^n$ with one or more of m response variables $R^1$ to $R^m$; f) applying n selected input variables $I^{s1}$, $I^{s2}$, $I^{s3}$, ... $I^{sn}$ to the calculated Response Surface Model (RSM) to predict one or more of m target response variables, $R^{t1}$, $R^{t2}$, $R^{t3}$, ... $R^{tm}$, each target response variable corresponding to a measurable polymer property; and g) using the n selected input variables $I^{s1}$ to $I^{sn}$ to operate the olefin polymerization reactor system and provide a polyolefin product. For example, in some embodiments, the Response Surface Model may be as described in DesLauriers et al., *Mapping the Structure-Property Space of Bimodal Polyethylenes Using Response Surface Methods. Part 1: Digital Data Investigation*, Macromol. React. Eng. 2018, 170066 ("DesLauriers"), the entirety of which is incorporated herein by reference.

For example, in some embodiments the RSM includes a digital catalyst as described in DesLauriers. As used herein, "digital catalyst" is used broadly to refer to mathematical models which may be implemented on a computer for predicting catalyst behavior including the homopolymerization rate of a catalyst, the molar balance for the concentration of precatalyst, the rate of change for the total molar concentration of living chains, and the polymerization rate. For example, the RSM may include a digital catalyst for a single type of active site, or for multiple active sites, such as to model polymerization using more than one metallocene, Ziegler-Natta, or Phillips catalysts.

In some embodiments, the RSM includes a molecular weight distribution model, for example, a molecular weight distribution model including chain transfer reactions based on the Bernoullian model, and chain length distribution models based on Flory's most probable distribution. In some embodiments, the RSM includes a short chain branching (SCB) model, for example in some embodiments the RSM includes an SCB model based on the Mayo-Lewis equation. In some embodiments, the RSM further includes the temperature dependence of kinetic constants, for example, the RSM may include the temperature dependence for kinetic constants based on the Arrhenius equation. For example, in some embodiments the rate of polymerization for a system of n single-site catalysts may be calculated using the following equation:

$$R_p = \sum_{i=1}^{n} k_{pi}[M] \left[ \frac{1 - \exp\left(-K_{ai}\left(1 - \frac{k_{di}}{K_{ai}}\right)t\right)}{\left(1 - \frac{k_{di}}{K_{ai}}\right)} \right] [C_{0i}] \exp(-k_{di}t)$$

wherein $k_{pi}$ is the propagation constant $k_p$ for catalyst i, [M] is the monomer concentration, $K_{ai}$ is the activation rate constant $K_a$ for catalyst i, $k_{di}$ is the deactivation rate constant $k_d$ for catalyst i, t is time, and $C_{0i}$ is the initial concentration $C_0$ of catalyst i. In some embodiments, the rate of polymerization, molecular weight, and short chain branching may be calculated using "method of moments" modeling techniques, which are described generally in Mastan et al., *Method of moments: A versatile tool for deterministic modeling of polymerization kinetics*, European Polymer J. 68 (2015) 139-160, which is incorporated herein by reference in its entirety. These methods are described in more detail in Example 2 below.

In some embodiments, the method further includes the steps of: h) measuring one or more properties of the polyolefin product corresponding to m measured response variables, $R^{m1}$, $R^{m2}$, $R^{m3}$, ... $R^{mm}$; and i) repeating steps a) through h) to reduce the difference between the target response variables $R^{t1}$ to $R^{tm}$ and the measured response variables $R^{m1}$ to $R^{mm}$.

In an aspect, a method of controlling an olefin polymerization reactor system is provided including: First, a) selecting n input variables $I^1$, $I^2$, $I^3$, ... $I^n$, each input variable corresponding to a process condition for an olefin polymerization process; b) identifying m response variables, $R^1$, $R^2$, $R^3$, ... $R^m$, each response variable corresponding to a measurable polymer property, wherein two of the m response variables are molecular weight distribution ("MWD") and short chain branching ("SCB"); c) adjusting one of more of the n input variables $I^1$ to $I^n$ in a plurality of polymerization reactions using the olefin polymerization reactor system, to provide a plurality of olefin polymers and measuring each of the m response variables $R^1$ to $R^m$ as a function of the input variables for each olefin polymer; d) analyzing the change in each of the response variables $R^1$ to $R^m$ as a function of the input variables $I^1$ to $I^n$ to determine the coefficients according to the following general equation for each response variable $R^1$ to $R^m$:

$$R^{1-m} = C^0 + \sum_{u=1}^{u=n} C^u(I^u);$$

e) calculating a Response Surface Model (RSM) using general equations for each response variable $R^1$ to $R^m$ ($R^{1-m}$) determined in step d) to correlate any combination of the n input variables $I^1$ to $I^n$ with one or more of m response variables $R^1$ to $R^m$; f) applying n selected input variables $I^{s1}$, $I^{s2}$, $I^{s3}$, ... $I^{sn}$ to the calculated Response Surface Model (RSM) to predict one or more of m target response variables, $R^{t1}$, $R^{t2}$, $R^{t3}$, ... $R^{tm}$, each target response variable corresponding to a measurable polymer property; and g) using the n selected input variables $I^{s1}$ to $I^{sn}$ to operate the olefin polymerization reactor system and provide a polyolefin product.

In some embodiments of this above method, the step of d) analyzing the change in each of the response variables $R^1$ to $R^m$ as a function of the input variables $I^1$ to $I^n$ further comprises adding the following sum to the general equation:

$$+ \sum_{k=1}^{v'} C^v(\text{product of a unique combination of 2 of } I^1 \text{ to } I^n,$$

independently selected);

wherein v' is the total number of unique combinations of any 2 of $I^1$ to $I^n$, independently selected, such that the general equation for each response variable $R^1$ to $R^m$ is:

$$R^{1-m} = C^0 + \sum_{u=1}^{u=n} C^u(I^u) +$$

$$\sum_{k=1}^{v'} C^v(\text{product of a unique combination of 2 of } I^1 \text{ to } I^n,$$

independently selected).

In other embodiments of this above method, the step of d) analyzing the change in each of the response variables $R^1$ to $R^m$ as a function of the input variables $I^1$ to $I^n$ further comprises adding the following sum to the general equation:

$$\sum_{w=1}^{w'} C^w (\text{product of a unique combination of 3 of } I^1 \text{ to } I^n,$$

independently selected);

wherein w' is the total number of unique combinations of any 3 of $I^1$ to $I^n$, independently selected, such that the general equation for each response variable $R^1$ to $R^m$ is:

$$R^{1-m} = C^0 + \sum_{u=1}^{u=n} C^u(I^u) +$$

$$\sum_{v=1}^{v'} C^v (\text{product of a unique combination of 2 of } I^1 \text{ to } I^n,$$

independently selected) +

$$\sum_{w=1}^{w'} C^w (\text{product of a unique combination of 3 of } I^1 \text{ to } I^n,$$

independently selected).

In other embodiments of this above method, the step of d) analyzing the change in each of the response variables $R^1$ to $R^m$ as a function of the input variables $I^1$ to $I^n$ further comprises adding the following sum to the general equation:

$$\sum_{x=1}^{x'} C^x (\text{product of a unique combination of 4 of } I^1 \text{ to } I^n,$$

independently selected);

wherein x' is the total number of unique combinations of any 4 of $I^1$ to $I^n$, independently selected, such that the general equation for each response variable $R^1$ to $R^m$ is:

$$R^{1-m} = C^0 + \sum_{u=1}^{u=n} C^u(I^u) +$$

$$\sum_{v=1}^{v'} C^v (\text{product of a unique combination of 2 of } I^1 \text{ to } I^n,$$

independently selected) +

$$\sum_{w=1}^{w'} C^w (\text{product of a unique combination of 3 of } I^1 \text{ to } I^n,$$

independently selected) +

$$\sum_{x=1}^{x'} C^x (\text{product of a unique combination of 4 of } I^1 \text{ to } I^n,$$

independently selected).

In some embodiments, the input variables $I^1$ to $I^n$ include feed rates to reactor for the catalyst, the cocatalyst, the activator, ethylene, α-olefin comonomer, hydrogen, reactor solvent, or any combination thereof. For example, in some embodiments, the olefin polymerization reactor system uses two or more catalysts and/or two or more co-catalysts in a single reactor, and the input variables $I^1$ to $I^n$ comprise catalyst type and catalyst concentration for each individual catalyst and/or co-catalyst type and co-catalyst concentration for each individual catalyst.

In some embodiments, the olefin polymerization reactor system is a single loop dual catalyst configuration. In some embodiments, the reactor system comprises two or more reactors in series, for example two reactors in series, three reactors in series, four reactors in series, and so on.

In some embodiments, the reactor system comprises two or more reactors and each reactor includes its own set of input variables. For example, in some embodiments, the olefin polymerization reactor system is a dual loop dual configuration, and each reactor has its own set of input variables $I^{1(Reactor\ 1)}$ to $I^{n(Reactor\ 1)}$, and $I^{1(Reactor\ 2)}$ to $I^{n(Reactor\ 2)}$.

In some embodiments, the catalyst type is selected from a Ziegler-Natta catalyst, a metallocene catalyst, a Phillips catalyst, or a constrained geometry catalyst.

In some embodiments, the molecular weight distribution (MWD) data (response variable) is [1] measured or [2] generated using the Bernoullian model.

In some embodiments, the short chain branching (SCB) data (response variable) is [1] measured or [2] generated using the Mayo-Lewis equation.

In some embodiments, the polyolefin product is a copolymer.

In another aspect, a method of controlling an olefin polymerization reactor system is provided which includes: a) selecting one or more of m target response variables, $R^{t1}$, $R^{t2}$, $R^{t3}$, ... $R^{tm}$, each target response variable corresponding to a measurable polymer property; b) calculating n selected input variables $I^{s1}$, $I^{s2}$, $I^{s3}$, ... $I^{sn}$ using the Response Surface Model (RSM) of claim 1, to achieve the one or more of m target response variables, $R^{t1}$, $R^{t2}$, $R^{t3}$, ... $R^{tm}$; c) using the n selected input variables $I^{s1}$ to $I^{sn}$ to operate the olefin polymerization reactor system and provide a polyolefin product; d) measuring one or more properties of the polyolefin product corresponding to in measured response variables, $R^{m1}$, $R^{m2}$, $R^{m3}$, ... $R^{mm}$; and e) repeating steps a) through d) to reduce the difference between the target response variables $R^{t1}$ to $R^{tm}$ and the measured response variables $R^{m1}$ to $R^{mm}$.

In some embodiments, the input variables $I^1$ to $I^n$ include reactor temperature, reaction time, average residence time, ethylene concentration, α-olefin comonomer concentration, hydrogen concentration, catalyst type, catalyst concentration, co-catalyst concentration, activator concentration, reactor configuration, reactor volume, catalyst feed rate, co-catalyst feed rate, activator feed rate, ethylene feed rate, α-olefin comonomer feed rate, hydrogen feed rate, reactor solvent feed rate, or any combination thereof.

In some embodiments, the olefin polymerization reactor system is a single loop dual catalyst configuration using two or more catalysts and/or two or more co-catalysts, and the input variables $I^1$ to $I^n$ comprise catalyst type and catalyst concentration for each individual catalyst and/or co-catalyst type and co-catalyst concentration for each individual catalyst.

In some embodiments, the olefin polymerization reactor system is a dual loop dual configuration, and each reactor comprising its own set of input variables $I^{1(Reactor\ 1)}$ to $I^{n(Reactor\ 1)}$, and $I^{1(Reactor\ 2)}$ to $I^{n(Reactor\ 2)}$.

In some embodiments, the catalyst type is selected from a Ziegler-Natta catalyst, a metallocene catalyst, a Phillips catalyst, or a constrained geometry catalyst.

In some embodiments, the one or more targeted resin properties include molecular weight distribution (MWD), short chain branching (SCB), density, Primary Structure Parameter 2 (PSP2), as described and determined in U.S. Pat. No. 8,048,679, the disclosure of which is incorporated by reference in its entirety, weight average molecular weight ($M_w$), number average molecular weight ($M_n$), polydispersity index ("PDI", $M_w/M_n$), viscosity at desired shear rates (frequencies), high load melt index (HMLI), melt index ("MI"), MI under a force of 10 kg ($I_{10}$), Magnitude Slick Stick, F ratio Magnitude of slip stick, Young's Modulus, Yield Stress, Yield Strain, Natural Draw ratio, Strain Hardening Modulus, environmental stress cracking ("ESCR"), full notched creep test for testing ESCR of pipes ("FNCT"), PENT, or NPT (Notched Pipe Test).

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150.degree. C. for nominally 4 hr with occasional and gentle agitation, before the solutions were transferred to sample vials for injection. An injection volume of about 200.mu.L was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. $M_n$ is the number-average molecular weight, $M_w$ is the weight-average molecular weight, $M_z$ is the z-average molecular weight, and $M_p$ is the peak molecular weight (location, in molecular weight, of the highest point of the molecular weight distribution curve). The IB parameter was determined from the molecular weight distribution curve (plot of dW/d(Log M) vs. Log M; normalized to an area equal to 1), and is defined as $1/[dW/d(\text{Log M})]_{MAX}$. PDI is calculated as $M_w/M_n$.

The following parameters are measured as specified. SCB is measured by SEC-FTIR. PSP2 is calculated by multiplying the area under the curve of the plot of the weighted tie molecule probability versus molecular weight by 100. Polymer density was determined in grams per cubic centimeter ($g/cm^3$) on a compression molded sample, cooled at about 15° C. per hour, and conditioned for about 40 hours at room temperature in accordance with ASTM D1505 and ASTM D4703.

Melt index (MI, g/10 min) was measured by measuring the rate of flow of a molten resin through an orifice of 0.0825 inch diameter as determined in accordance with ASTM D1238 at 190° C., with a 2.160 gram weight. The melt index under a force of 10 kg ($I_{10}$, dg/min) represents the rate of flow of a molten resin through an orifice of 0.0825 inch diameter when subjected to the indicated force (10 kg) at 190° C. as determined in accordance with ASTM D1238. In some embodiments, the polyolefin has an ho of from about 0.5 dg/min. to about 4 dg/min., alternatively from about 1 dg/min. to about 3 dg/min., or alternatively from about 1.5 dg/min. to about 2.5 dg/min.

High Load Melt Index (HMLI, dg/min) is measured by measuring the rate of flow of a molten resin through an orifice of 0.0825 inch diameter when subjected to a force of 21.6 kg at 190° C. in accordance with ASTM D1238. In some embodiments, the polyolefin has an HMLI of from about 5 dg/min to about 15 dg/min, alternatively less than about 15 dg/min., alternatively less than about 12 dg/min., or alternatively less than about 10 dg/min.

Viscosity is measured by a dynamic frequency sweep measurement, or by capillary extrusion experiments. For example, for the dynamic frequency sweep measurement, polymer pellet samples may be compression molded at 182° C. for a total of about 3 min. The samples may then be allowed to melt at a relatively low pressure for 1 min and then subjected to a high molding pressure for additional 2 min. The molded samples may then be quenched in a cold (room temperature) press, and then about 25.4 mm diameter disks may be stamped out of the molded slabs for the measurement in a rotational rheometer. The measurements may be performed in parallel plates of 25 mm in diameter at 190° C. using a controlled-stress rheometer equipped with an air bearing system, such as Physica MCR-500, available from Anton Paar. The test chamber of the rheometer may then be purged with nitrogen to minimize oxidative degradation. After thermal equilibration, the specimens may be squeezed between the plates to a 1.6 mm thickness, and the excess trimmed. The dynamic frequency sweep test may then be performed with 1-10% strain in the LVE regime at angular frequencies from 0.0316 to 316 rad/s Capillary extrusion experiments may be carried out at 190° C., using a dual-bore capillary rheometer, such as a Rosand RH-7, available from Malvern, operated in constant speed mode. A capillary die with 1 mm diameter and of 16 mm length and an orifice die with 1 mm diameter may be used. For example, the entrance angle for the dies may be about 180°, and the contraction ratio from the reservoir barrel to the die may be about 15. Bagley correction and Rabinowitsch correction may be applied to obtain steady shear stresses as a function of shear rate.

The Magnitude Slick Stick and the F ratio Magnitude of slip stick are measured by the methods detailed in U.S. Pat. No. 8,771,816, which is hereby incorporated herein by reference in its entirety. In some embodiments, Young's Modulus is measured by rom the slope of a stress-strain curve created during tensile tests conducted on a sample of a material, as determined in accordance with ASTM D638. In some embodiments, Yield Strain is measured by ASTM D638. In some embodiments, natural draw ratio is measured by ASTM D638. In some embodiments, Strain hardening modulus is measured by ISO 18488, using compression molded die-cut tensile specimens which were nominally 0.3 mm thick. In some embodiments, ESCR is measured by ASTM D1693, condition B, 10% Igepal. In some embodiments, FNCT is measured by ISO 16770. PENT (Pennsylvania Notched Test) is measured by ASTM F1473. NPT (Notched Pipe Test) is measured by ISO 13479.

As described herein, in some aspects, the olefin polymerization reactor system produces more than one component of the olefin polymer, and the one or more targeted resin properties comprise $M_w$, $M_n$, PDI, density, and fraction for each component of the polymer.

In some embodiments, the viscosity at desired shear rates (frequencies) includes Eta(0.01), Eta(0.126), Eta(1.585), Eta(19.953), or Eta(251.189).

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

In each of the examples below, the kinetic input for stage 101 of the schematic overview of the process is shown in FIG. 1. The kinetic input for each off the examples below was calculated for a particular Ziegler-Natta catalyst, using both fundamental equations as described above and experimentally-derived kinetic data.

Example 1—Response Surface Method Generation for a Two Reactor Process

We used Stat Ease software to generate a seven-factor optimal design of experiments (DoE) and response surface methodology models for a two reactor process using a specific catalyst with experimentally-determined kinetic properties. The input variables used are shown in Table 1 below:

TABLE 1

| Input Variables & Values | | | | |
|---|---|---|---|---|
| Input Variable | Description | Units | Minimum | Maximum |
| $I^1$ | Catalyst feed to first reactor ("Cat Feed Rx 1") | lb/hr | 0.0012 | 0.0028 |
| $I^2$ | Temperature of first reactor ("Temp Rx 1") | Deg F | 184 | 208 |
| $I^3$ | Feed of 0.5 wt. % triethylaluminum to first reactor ("0.5 wt % TEA Rx 1") | lb/hr | 0.25 | 1.25 |
| $I^4$ | Ethylene Feed to First Reactor ("C2 Rx 1") | lb/hr | 30 | 45 |
| $I^5$ | Weight Ratio of hexene feed to ethylene feed to first reactor ("C6/C2 Rx 1") | — | 0.0025 | 0.06 |

TABLE 1-continued

| Input Variables & Values | | | | |
|---|---|---|---|---|
| Input Variable | Description | Units | Minimum | Maximum |
| $I^6$ | Weight Ratio of hydrogen feed to ethylene feed to first reactor ("H2/C2 Rx 1") | — | 0 | 0.0014 |
| $I^7$ | iC4 of product of first reactor ("iC4 Rx 1") | lb/hr | 50 | 72 |
| $I^8$ | Temperature of second reactor ("Temp Rx 2") | Deg F | 184 | 208 |
| $I^9$ | Feed of 0.5 wt % triethylaluminum solution to second reactor ("0.5 wt % TEA Rx 2") | lb/hr | 0.5 | 1.25 |
| $I^{10}$ | Ethylene feed to first reactor ("C2 Rx 2") | lb/hr | 30 | 45 |
| $I^{11}$ | Weight Ratio of hexene feed to ethylene feed to second reactor ("C6/C2 Rx 2") | — | 0 | 0.020 |
| $I^{12}$ | Weight Ratio of hydrogen feed to ethylene feed to second reactor ("H2/C2 Rx 2") | — | 0.0002 | 0.0038 |
| $I^{13}$ | iC4 of product of second reactor ("iC4 Rx 2") | lb/hr | 50 | 72 |

Throughout these examples, any reference to input variables $I^1$ to $I^{13}$ refers to the descriptions and units detailed in Table 1.

The calculated response variables (30 illustrated), based on experimentally derived kinetic data, fundamental kinetic equations, and various property models described above, along with input reactor variables are shown in Table 2 below, along with the typical error associated with each variable.

TABLE 2

| Response Variables | | | |
|---|---|---|---|
| Response Variables | Description | Units | Typical Error +/− |
| $R^1$ | Concentration of ethylene gas in first reactor ("C2gas1") | mol % | 1% |
| $R^2$ | Concentration of hexene gas in first reactor ("C6gas1") | mol % | 1% |
| $R^3$ | Concentration of hydrogen gas in first reactor ("H2gas1") | mol % | 2% |
| $R^4$ | Concentration of ethylene gas in second reactor ("C2gas2") | mol % | 1% |
| $R^5$ | Concentration of hexene gas in second reactor ("C6gas2") | mol % | 1% |
| $R^6$ | Concentration of hydrogen gas in second reactor ("H2gas2") | mol % | 1% |
| $R^7$ | $M_w$ of product of first reactor ("$M_w$ RX-1") | g/mol | 8% |
| $R^8$ | $M_n$ of product of first reactor ("$M_n$ RX-1") | g/mol | 8% |
| $R^9$ | Density of product of first reactor ("RX-1 density") | g/cm³ | 0.002 |
| $R^{10}$ | Weight fraction of product of second reactor which is from first reactor ("Wt frac RX-1") | — | 0.001 |
| $R^{11}$ | $M_w$ of the product of the second reactor ("Blend $M_w$") | g/mol | 8% |
| $R^{12}$ | $M_n$ of the product of the second reactor ("Blend $M_n$) | g/mol | 8% |
| $R^{13}$ | PDI of the product of the second reactor ("Blend PDI") | — | 1 |
| $R^{14}$ | Density of the product of the second reactor ("Blend density") | g/cm³ | 0.002 |
| $R^{15}$ | % solids in first reactor ("Solids RX-1") | wt % | 0.2 |
| $R^{16}$ | % solids in second reactor ("Solids RX-2") | wt % | 0.2 |

TABLE 2-continued

Response Variables

| Response Variables | Description | Units | Typical Error +/− |
|---|---|---|---|
| $R^{17}$ | % yield of first reactor ("Yield % RX-1") | % | 0.2 |
| $R^{18}$ | % yield of second reactor ("Yield % RX-2") | % | 0.2 |
| $R^{19}$ | Product flow rate of first reactor ("Productivity RX-1") | lbs/h | 0.4 |
| $R^{20}$ | Product flow rate of second reactor ("Productivity RX-2") | lbs/h | 0.4 |
| $R^{21}$ | Catalyst Activity | g polymer/g catalyst | 1% |
| $R^{22}$ | PSP2 | | 0.7 |
| $R^{23}$ | HLMI | 21.6 g/min | 22% |
| $R^{24}$ | I10 | 10 g/min | 22% |
| $R^{25}$ | MI | 2.16 g/min | 30% |
| $R^{26}$ | Rheo pt 1 | 0.01 radians/s | 22% |
| $R^{27}$ | Rheo pt 2 | 0.126 radians/s | 20% |
| $R^{28}$ | Rheo pt 3 | 1.585 radians/s | 20% |
| $R^{29}$ | Rheo pt 4 | 19.953 radians/s | 20% |
| $R^{30}$ | Rheo pt 5 | 251.189 radians/s | 20% |

Rheo pt 1, Rheo pt 2, Rheo pt 3, Rheo pt 4, and Rheo pt 5 each refer to points along a rheology or viscosity curve, when viscosity is plotted against frequency of oscillation in radians per second. The units given refer to the particular frequency of oscillation where the viscosity is measured. Throughout these examples, any reference to response variables $R^1$ to $R^{30}$ refers to the descriptions and units detailed in Table 2.

Without intending to be bound by any particular theory, it is believed that use of the RSM allows one of skill in the art to minimize the number of experiments in the DoE, while retaining an acceptable predictive ability.

Example 2—Generation of Forward Models and Optimization Process Using the Response Surface Methods Next, reactor conditions and product spaces were determined using the RSM ranges given in Example 1. First, as described in Example 1 above, and the schematic overview given in FIG. 1, specific catalyst kinetic data 101 as previously described, reactor conditions 103 are used as input variables for the Response Surface Method 109, and polymer microstructures 105 and polymer properties 107 are used as response variables for the Response Surface Method 109. The Response Surface Method 109, implemented in control software 100, is then used to determine predicted polymer microstructures and properties 111. In order to optimize the selected RSM input variables, specific product targets 113 were input into optimization and desirability functions 115 to arrive at selected optimal reactor targets 117.

A 115 sample DoE was constructed as shown in Table 3 and analyzed. This DoE is for polymerization conditions and primary responses for a one catalyst and two reactor process. This table shows the individual levels for the 13 input variables given in Table 1. The changes in calculated response variables listed in Table 2 for each condition (run) were then correlated to the change in input response level. All responses were modeled independently (30 models in this case), and ANOVA tables and DoE equations were used to predict responses.

Optimization conditions were determined by calculating the desirability function provided in Stat Ease software. As would be understood by one of skill in the art, the overall desirability function (D) is calculated by assigning each response $Y_i(x)$, a desirability function $d_i(Y_i)$ that ranges between $d_i(Y_i)=0$, indicating an undesirable response, to $d_i(Y_i)=1$, indicating a highly desirable response. A response transform based on the Nominal-The-Best was used.

The polymerization conditions and primary responses for the initial IV-optimal DoE (calibration set) are shown in Table 3 below, using the input variables of Table 1.

TABLE 3

Polymerization Conditions and Primary Responses

| RUN | $I^1$ ×10⁻³ | $I^2$ | $I^3$ | $I^4$ | $I^5$ ×10⁻² | $I^6$ ×10⁻³ | $I^7$ | $I^8$ | $I^9$ | $I^{10}$ | $I^{11}$ ×10⁻² | $I^{12}$ ×10⁻⁴ | $I^{13}$ |
|---|---|---|---|---|---|---|---|---|---|---|---|---|---|
| 1 | 2.80 | 184.0 | 1.5 | 50 | 6.70 | 1.40 | 50.0 | 185.4 | 1.5 | 37.85 | 0.10 | 0.02 | 50.0 |
| 2 | 2.80 | 184.0 | 0.25 | 50 | 6.70 | 0.00 | 50.0 | 208.0 | 0.25 | 50 | 2.00 | 0.02 | 52.0 |
| 3 | 1.90 | 187.1 | 0.25 | 33.8 | 4.73 | 0.00 | 50.0 | 185.3 | 0.25 | 30 | 2.00 | 0.38 | 71.7 |
| 4 | 2.80 | 208.0 | 1.5 | 44 | 0.65 | 1.40 | 50.0 | 184.0 | 0.25 | 30 | 0.00 | 0.02 | 72.0 |
| 5 | 1.67 | 197.2 | 1.19 | 30.3 | 0.65 | 0.55 | 72.0 | 191.6 | 0.98 | 46.2 | 0.00 | 0.02 | 64.4 |
| 6 | 1.20 | 197.2 | 0.25 | 30 | 0.65 | 1.40 | 72.0 | 202.1 | 1.5 | 30 | 2.00 | 0.25 | 55.1 |
| 7 | 2.80 | 185.6 | 1.11 | 30 | 6.70 | 0.28 | 72.0 | 184.0 | 0.25 | 34.6 | 0.00 | 0.27 | 72.0 |
| 8 | 1.20 | 208.0 | 1.5 | 30 | 6.70 | 0.00 | 50.0 | 184.0 | 0.25 | 44.2 | 2.00 | 0.38 | 56.3 |
| 9 | 2.49 | 194.6 | 1.5 | 30 | 3.68 | 0.00 | 54.0 | 204.8 | 0.66 | 33 | 0.00 | 0.38 | 50.0 |
| 10 | 2.80 | 198.9 | 1.5 | 40.61 | 6.70 | 0.64 | 60.0 | 189.4 | 0.76 | 50 | 1.94 | 0.10 | 50.0 |
| 11 | 2.80 | 184.0 | 1.5 | 50 | 0.65 | 1.40 | 72.0 | 208.0 | 1.5 | 30 | 2.00 | 0.38 | 50.0 |
| 12 | 2.80 | 208.0 | 1.5 | 50 | 1.86 | 0.92 | 50.0 | 208.0 | 0.25 | 50 | 1.30 | 0.38 | 61.4 |

TABLE 3-continued

Polymerization Conditions and Primary Responses

| RUN | $I^1$ ×10$^{-3}$ | $I^2$ | $I^3$ | $I^4$ | $I^5$ ×10$^{-2}$ | $I^6$ ×10$^{-3}$ | $I^7$ | $I^8$ | $I^9$ | $I^{10}$ | $I^{11}$ ×10$^{-2}$ | $I^{12}$ ×10$^{-4}$ | $I^{13}$ |
|---|---|---|---|---|---|---|---|---|---|---|---|---|---|
| 13 | 2.80 | 204.6 | 0.44 | 47.9 | 5.70 | 0.71 | 65.1 | 184.0 | 1.5 | 49 | 0.00 | 0.02 | 61.1 |
| 14 | 2.38 | 208.0 | 1.5 | 30.6 | 6.70 | 1.40 | 54.4 | 196.0 | 0.97 | 50 | 0.00 | 0.38 | 72.0 |
| 15 | 1.20 | 208.0 | 0.25 | 30 | 6.70 | 0.00 | 50.0 | 206.1 | 0.71 | 30 | 2.00 | 0.19 | 50.0 |
| 16 | 1.20 | 208.0 | 0.25 | 50 | 6.70 | 1.40 | 50.0 | 184.0 | 1.5 | 50 | 1.90 | 0.38 | 72.0 |
| 17 | 1.20 | 208.0 | 1.23 | 50 | 0.65 | 0.00 | 72.0 | 184.3 | 0.25 | 30 | 2.00 | 0.34 | 72.0 |
| 18 | 1.20 | 184.0 | 0.25 | 50 | 0.65 | 1.04 | 72.0 | 184.0 | 0.25 | 30 | 0.05 | 0.02 | 72.0 |
| 19 | 2.80 | 208.0 | 1.5 | 30 | 6.70 | 0.00 | 72.0 | 208.0 | 0.25 | 50 | 2.00 | 0.38 | 72.0 |
| 20 | 1.20 | 184.0 | 1.5 | 50 | 6.70 | 0.00 | 72.0 | 184.0 | 0.25 | 50 | 0.46 | 0.02 | 72.0 |
| 21 | 2.80 | 208.0 | 1.5 | 30 | 0.95 | 1.40 | 72.0 | 192.6 | 1.5 | 42.2 | 0.98 | 0.18 | 51.1 |
| 22 | 1.53 | 208.0 | 1.46 | 39.8 | 2.16 | 1.15 | 52.2 | 201.1 | 1.5 | 30 | 1.92 | 0.38 | 59.5 |
| 23 | 1.90 | 202.0 | 0.25 | 50 | 4.19 | 1.40 | 50.0 | 208.0 | 0.83 | 50 | 0.00 | 0.06 | 72.0 |
| 24 | 2.60 | 184.0 | 0.25 | 38.4 | 0.65 | 0.63 | 53.4 | 184.0 | 0.25 | 41 | 1.12 | 0.02 | 50.0 |
| 25 | 2.80 | 194.6 | 0.41 | 48.5 | 0.65 | 1.40 | 72.0 | 198.9 | 0.25 | 50 | 1.31 | 0.02 | 50.0 |
| 26 | 2.76 | 208.0 | 1.5 | 50 | 0.65 | 0.00 | 54.3 | 203.0 | 1.5 | 49.3 | 2.00 | 0.02 | 72.0 |
| 27 | 2.80 | 184.0 | 1.12 | 48 | 4.28 | 0.84 | 63.9 | 194.8 | 0.25 | 38.3 | 2.00 | 0.02 | 72.0 |
| 28 | 1.89 | 208.0 | 1.05 | 30 | 6.70 | 0.06 | 63.6 | 185.1 | 1.09 | 30 | 1.73 | 0.02 | 72.0 |
| 29 | 2.11 | 208.0 | 0.25 | 42.5 | 0.65 | 1.09 | 59.4 | 208.0 | 0.25 | 34 | 2.00 | 0.07 | 65.3 |
| 30 | 1.28 | 208.0 | 1.5 | 50 | 0.65 | 0.13 | 50.0 | 184.0 | 1.5 | 50 | 0.00 | 0.38 | 50.0 |
| 31 | 2.80 | 196.5 | 0.25 | 50 | 0.65 | 0.59 | 50.0 | 191.9 | 1.47 | 30 | 1.53 | 0.20 | 72.0 |
| 32 | 1.20 | 184.0 | 0.25 | 50 | 4.95 | 0.09 | 72.0 | 208.0 | 1.19 | 38 | 2.00 | 0.38 | 72.0 |
| 33 | 1.20 | 190.2 | 1.46 | 40.4 | 0.65 | 1.40 | 60.5 | 196.0 | 0.25 | 39.2 | 0.00 | 0.18 | 50.0 |
| 34 | 2.80 | 208.0 | 0.25 | 50 | 6.70 | 1.40 | 72.0 | 184.0 | 0.25 | 30 | 2.00 | 0.02 | 50.0 |
| 35 | 1.20 | 184.0 | 0.25 | 38 | 0.65 | 1.40 | 50.0 | 208.0 | 0.25 | 50 | 2.00 | 0.38 | 72.0 |
| 36 | 1.34 | 196.8 | 1.5 | 50 | 0.65 | 1.40 | 71.8 | 208.0 | 1.5 | 39.2 | 0.86 | 0.16 | 72.0 |
| 37 | 2.34 | 206.8 | 0.69 | 34.9 | 0.65 | 0.00 | 66.5 | 208.0 | 0.84 | 50 | 2.00 | 0.36 | 50.4 |
| 38 | 2.61 | 197.5 | 1.5 | 50 | 6.70 | 0.28 | 72.0 | 184.0 | 1.5 | 34.97 | 2.00 | 0.38 | 70.6 |
| 39 | 2.80 | 208.0 | 0.98 | 50 | 0.65 | 0.99 | 53.1 | 208.0 | 1.16 | 30 | 0.00 | 0.02 | 50.0 |
| 40 | 1.92 | 184.0 | 0.84 | 39.7 | 0.65 | 0.60 | 65.7 | 184.0 | 1.5 | 30 | 0.93 | 0.38 | 50.0 |
| 41 | 2.80 | 188.3 | 1.36 | 50 | 5.85 | 1.40 | 72.0 | 184.0 | 0.25 | 50 | 0.00 | 0.38 | 50.0 |
| 42 | 2.80 | 198.4 | 1.37 | 30 | 0.65 | 0.21 | 50.0 | 193.8 | 0.25 | 30 | 2.00 | 0.03 | 53.0 |
| 43 | 2.80 | 184.0 | 0.25 | 30 | 0.65 | 1.33 | 50.0 | 184.0 | 0.25 | 50 | 0.00 | 0.38 | 50.0 |
| 44 | 2.80 | 208.0 | 0.25 | 30 | 6.70 | 1.40 | 64.3 | 208.0 | 0.25 | 50 | 0.00 | 0.02 | 51.8 |
| 45 | 2.38 | 208.0 | 1.5 | 30.6 | 6.70 | 1.40 | 54.4 | 196.0 | 0.97 | 50 | 0.00 | 0.38 | 72.0 |
| 46 | 1.20 | 184.0 | 1.15 | 32 | 6.70 | 0.28 | 50.0 | 184.0 | 0.25 | 30 | 0.00 | 0.02 | 50.0 |
| 47 | 2.48 | 205.1 | 0.79 | 32 | 4.89 | 0.96 | 72.0 | 200.1 | 0.25 | 30 | 1.07 | 0.38 | 50.0 |
| 48 | 2.80 | 208.0 | 0.25 | 40 | 3.25 | 1.40 | 50.0 | 184.0 | 1.5 | 50 | 2.00 | 0.38 | 50.0 |
| 49 | 2.80 | 208.0 | 0.25 | 30 | 0.65 | 0.00 | 72.0 | 193.0 | 1.5 | 30 | 0.00 | 0.38 | 72.0 |
| 50 | 2.80 | 208.0 | 0.25 | 40 | 3.25 | 1.40 | 50.0 | 184.0 | 1.5 | 50 | 2.00 | 0.38 | 50.0 |
| 51 | 2.80 | 184.0 | 1.5 | 50 | 1.01 | 0.00 | 62.1 | 184.0 | 0.56 | 42.3 | 0.30 | 0.02 | 53.3 |
| 52 | 2.50 | 184.0 | 0.25 | 41.5 | 3.89 | 0.66 | 72.0 | 199.0 | 0.9 | 36.4 | 0.00 | 0.19 | 50.0 |
| 53 | 2.80 | 184.0 | 1.38 | 50 | 6.70 | 0.00 | 72.0 | 208.0 | 1.5 | 50 | 0.00 | 0.09 | 65.1 |
| 54 | 1.31 | 195.9 | 0.86 | 50 | 4.22 | 0.00 | 63.1 | 191.2 | 1.5 | 30 | 0.00 | 0.17 | 63.1 |
| 55 | 2.80 | 184.0 | 0.25 | 30 | 0.65 | 0.00 | 72.0 | 184.0 | 1.5 | 50 | 2.00 | 0.02 | 72.0 |
| 56 | 2.80 | 188.8 | 0.75 | 39 | 0.65 | 1.40 | 50.0 | 208.0 | 1.5 | 41.5 | 0.00 | 0.38 | 63.2 |
| 57 | 1.20 | 201.6 | 0.25 | 37.6 | 0.65 | 0.19 | 50.0 | 184.0 | 1.17 | 43.3 | 1.43 | 0.02 | 61.6 |
| 58 | 2.80 | 193.0 | 1.28 | 30 | 3.83 | 0.00 | 50.0 | 184.0 | 1.5 | 50 | 1.04 | 0.24 | 69.3 |
| 59 | 1.72 | 184.0 | 1.5 | 50 | 6.70 | 0.00 | 72.0 | 197.4 | 0.25 | 30 | 1.30 | 0.38 | 50.0 |
| 60 | 1.98 | 206.9 | 0.25 | 40.2 | 6.70 | 0.48 | 72.0 | 207.5 | 0.25 | 42.4 | 2.00 | 0.02 | 50.0 |
| 61 | 1.98 | 208.0 | 1.5 | 50 | 6.70 | 0.58 | 72.0 | 207.0 | 0.25 | 37.5 | 0.00 | 0.13 | 60.7 |
| 62 | 1.20 | 192.6 | 1.5 | 38.8 | 6.70 | 1.40 | 72.0 | 184.0 | 0.32 | 30 | 1.93 | 0.26 | 69.3 |
| 63 | 1.20 | 208.0 | 1.4 | 50 | 3.68 | 1.19 | 69.6 | 184.0 | 0.99 | 36 | 1.12 | 0.02 | 50.6 |
| 64 | 1.99 | 188.0 | 1.02 | 50 | 0.65 | 1.40 | 50.0 | 184.0 | 0.58 | 50 | 1.80 | 0.14 | 62.9 |
| 65 | 1.20 | 208.0 | 1.5 | 30 | 6.70 | 1.35 | 50.0 | 208.0 | 1.5 | 47 | 0.00 | 0.02 | 59.1 |
| 66 | 1.20 | 195.4 | 0.25 | 50 | 4.40 | 0.79 | 58.9 | 184.0 | 0.25 | 39.3 | 1.89 | 0.31 | 50.0 |
| 67 | 1.20 | 208.0 | 0.88 | 49.4 | 6.70 | 1.40 | 72.0 | 200.8 | 0.77 | 50 | 2.00 | 0.30 | 56.2 |
| 68 | 1.20 | 184.0 | 0.6 | 30 | 2.22 | 0.00 | 66.2 | 203.2 | 0.26 | 44 | 1.28 | 0.14 | 59.9 |
| 69 | 1.20 | 196.0 | 1.5 | 50 | 6.70 | 0.00 | 50.0 | 208.0 | 0.25 | 30 | 2.00 | 0.02 | 72.0 |
| 70 | 1.20 | 196.0 | 0.25 | 30 | 6.70 | 0.00 | 72.0 | 184.0 | 1.33 | 49.6 | 0.32 | 0.38 | 50.0 |
| 71 | 1.55 | 197.0 | 0.67 | 30 | 6.61 | 0.75 | 65.1 | 206.2 | 1.5 | 50 | 2.00 | 0.14 | 71.7 |
| 72 | 2.16 | 199.1 | 0.34 | 30 | 5.52 | 1.40 | 51.9 | 184.0 | 1.34 | 30 | 0.15 | 0.22 | 57.6 |
| 73 | 2.80 | 208.0 | 0.71 | 45.3 | 6.70 | 0.00 | 50.0 | 185.2 | 0.72 | 36 | 0.52 | 0.33 | 58.0 |
| 74 | 1.20 | 208.0 | 1.5 | 30 | 6.70 | 1.35 | 50.0 | 208.0 | 1.5 | 47 | 0.00 | 0.02 | 59.1 |
| 75 | 1.92 | 208.0 | 0.25 | 30 | 0.65 | 0.00 | 66.5 | 184.0 | 0.25 | 30 | 0.00 | 0.02 | 50.0 |
| 76 | 1.20 | 184.0 | 0.25 | 47.18 | 6.70 | 1.37 | 55.9 | 202.5 | 1.34 | 30 | 1.67 | 0.02 | 59.0 |
| 77 | 1.20 | 184.0 | 0.96 | 47.8 | 5.61 | 0.00 | 50.0 | 194.8 | 1.34 | 50 | 2.00 | 0.27 | 50.0 |
| 78 | 2.17 | 202.8 | 0.25 | 50 | 6.70 | 0.89 | 59.9 | 208.0 | 1.5 | 40.5 | 0.87 | 0.35 | 50.0 |
| 79 | 1.50 | 184.0 | 1.5 | 34.8 | 1.26 | 0.78 | 72.0 | 193.8 | 1.5 | 50 | 2.00 | 0.38 | 60.6 |
| 80 | 1.20 | 184.0 | 0.25 | 45 | 5.67 | 1.40 | 50.0 | 184.0 | 0.63 | 50 | 0.00 | 0.02 | 50.0 |
| 81 | 1.50 | 184.0 | 1.5 | 34.8 | 1.26 | 0.78 | 72.0 | 193.8 | 1.5 | 50 | 2.00 | 0.38 | 60.6 |
| 82 | 1.20 | 208.0 | 1.5 | 42 | 4.52 | 0.00 | 67.4 | 208.0 | 1.27 | 49.4 | 0.37 | 0.38 | 69.8 |
| 83 | 2.31 | 191.6 | 0.52 | 48.5 | 0.65 | 0.00 | 61.0 | 194.8 | 0.38 | 49.4 | 0.15 | 0.38 | 72.0 |
| 84 | 1.59 | 184.0 | 0.51 | 30 | 6.70 | 1.40 | 72.0 | 184.0 | 0.26 | 50 | 2.00 | 0.02 | 50.0 |
| 85 | 2.10 | 184.0 | 1.14 | 36.9 | 6.28 | 1.40 | 50.0 | 208.0 | 0.46 | 39 | 1.63 | 0.26 | 50.0 |
| 86 | 2.53 | 208.0 | 0.49 | 33.3 | 4.34 | 0.00 | 50.0 | 208.0 | 1.28 | 37.8 | 1.71 | 0.38 | 72.0 |
| 87 | 1.20 | 190.4 | 0.56 | 40.2 | 6.70 | 0.56 | 54.4 | 208.0 | 0.25 | 50 | 0.00 | 0.38 | 59.2 |

TABLE 3-continued

Polymerization Conditions and Primary Responses

| RUN | $I^1$ ×10⁻³ | $I^2$ | $I^3$ | $I^4$ | $I^5$ ×10⁻² | $I^6$ ×10⁻³ | $I^7$ | $I^8$ | $I^9$ | $I^{10}$ | $I^{11}$ ×10⁻² | $I^{12}$ ×10⁻⁴ | $I^{13}$ |
|---|---|---|---|---|---|---|---|---|---|---|---|---|---|
| 88 | 1.20 | 184.0 | 1.5 | 30 | 6.70 | 1.31 | 72.0 | 208.0 | 1.5 | 30 | 0.00 | 0.38 | 50.0 |
| 89 | 1.20 | 208.0 | 0.25 | 39 | 6.70 | 1.40 | 72.0 | 203.7 | 1.5 | 30 | 0.00 | 0.02 | 72.0 |
| 90 | 2.80 | 198.9 | 0.87 | 30 | 0.65 | 1.40 | 60.8 | 184.0 | 0.87 | 38.4 | 1.94 | 0.38 | 72.0 |
| 91 | 1.20 | 184.0 | 1.5 | 30 | 6.70 | 1.31 | 72.0 | 208.0 | 1.5 | 30 | 0.00 | 0.38 | 50.0 |
| 92 | 2.80 | 208.0 | 0.75 | 33.3 | 6.70 | 1.40 | 50.0 | 208.0 | 1.5 | 30 | 2.00 | 0.02 | 72.0 |
| 93 | 1.20 | 197.2 | 0.56 | 30 | 6.64 | 1.40 | 50.4 | 192.1 | 0.25 | 40.6 | 1.01 | 0.02 | 72.0 |
| 94 | 1.20 | 208.0 | 0.81 | 30 | 0.65 | 0.53 | 50.0 | 208.0 | 0.47 | 36 | 0.28 | 0.28 | 72.0 |
| 95 | 2.80 | 198.0 | 0.3 | 44 | 4.22 | 0.00 | 72.0 | 208.0 | 0.68 | 30 | 0.84 | 0.02 | 69.1 |
| 96 | 2.09 | 184.0 | 0.74 | 30 | 0.74 | 0.92 | 55.2 | 208.0 | 1.5 | 50 | 1.00 | 0.02 | 50.0 |
| 97 | 1.28 | 184.0 | 1.5 | 50 | 3.61 | 0.82 | 50.0 | 191.7 | 0.78 | 36.2 | 0.25 | 0.38 | 69.8 |
| 98 | 2.29 | 184.0 | 1.5 | 30 | 4.49 | 1.40 | 63.9 | 202.5 | 0.49 | 30 | 0.50 | 0.02 | 63.1 |
| 99 | 2.80 | 184.0 | 0.25 | 50 | 6.70 | 1.40 | 55.7 | 208.0 | 0.25 | 30 | 0.00 | 0.38 | 72.0 |
| 100 | 2.80 | 184.0 | 0.72 | 30 | 6.70 | 0.00 | 62.2 | 202.1 | 1.5 | 30 | 2.00 | 0.38 | 50.0 |
| 101 | 2.40 | 184.0 | 1.5 | 36.4 | 0.65 | 0.04 | 67.5 | 208.0 | 1.16 | 30 | 1.41 | 0.28 | 72.0 |
| 102 | 2.00 | 208.0 | 0.25 | 35 | 2.95 | 0.75 | 72.0 | 184.0 | 0.25 | 50 | 1.34 | 0.22 | 66.5 |
| 103 | 1.20 | 184.0 | 1.5 | 30 | 0.65 | 1.40 | 50.0 | 184.0 | 1.5 | 30 | 2.00 | 0.02 | 72.0 |
| 104 | 1.69 | 195.3 | 1.32 | 38.9 | 4.31 | 0.00 | 72.0 | 208.0 | 1.5 | 37.3 | 2.00 | 0.02 | 50.0 |
| 105 | 1.95 | 184.0 | 1 | 30 | 1.35 | 1.40 | 72.0 | 208.0 | 0.25 | 48.7 | 0.00 | 0.38 | 72.0 |
| 106 | 2.80 | 184.0 | 0.25 | 38.1 | 6.70 | 1.40 | 66.7 | 192.5 | 0.94 | 48.2 | 1.32 | 0.34 | 66.9 |
| 107 | 1.20 | 184.0 | 0.42 | 37.5 | 2.47 | 1.40 | 62.8 | 184.0 | 1.5 | 50 | 0.00 | 0.20 | 72.0 |
| 108 | 1.20 | 208.0 | 1.5 | 30 | 0.65 | 1.40 | 72.0 | 208.0 | 0.25 | 50 | 2.00 | 0.02 | 50.0 |
| 109 | 1.20 | 208.0 | 0.25 | 50 | 0.65 | 0.00 | 72.0 | 208.0 | 1.5 | 50 | 0.00 | 0.02 | 50.0 |
| 110 | 1.20 | 208.0 | 1.5 | 37.6 | 3.83 | 0.41 | 62.2 | 199.1 | 0.25 | 30 | 2.00 | 0.16 | 55.0 |
| 111 | 1.58 | 208.0 | 0.25 | 50 | 0.65 | 1.40 | 72.0 | 188.8 | 0.78 | 34 | 0.00 | 0.38 | 57.7 |
| 112 | 2.10 | 184.0 | 0.25 | 30 | 6.70 | 0.00 | 50.0 | 204.9 | 1.5 | 38 | 0.00 | 0.02 | 72.0 |
| 113 | 1.90 | 208.0 | 0.85 | 39.9 | 3.83 | 0.00 | 50.0 | 196.5 | 0.25 | 50 | 0.58 | 0.02 | 50.0 |
| 114 | 2.80 | 184.0 | 1.5 | 35 | 0.65 | 0.63 | 50.0 | 208.0 | 0.25 | 50 | 0.00 | 0.02 | 72.0 |
| 115 | 1.20 | 184.0 | 0.25 | 50 | 0.65 | 0.00 | 50.0 | 208.0 | 0.25 | 30 | 0.22 | 0.38 | 50.0 |

The resulting response variable ranges obtained from the input data, transformations used, and equation forms to fit the data, as well as the resulting predictive R-squared obtained from ANOVA are shown in Table 4 below. As can be seen from this table, excellent fits were obtained for all of the response variables.

TABLE 4

General Fits for Response Variables

| Response Variable | Minimum | Maximum | Transformation | Model Fit | Predicted R-Squared from ANOVA |
|---|---|---|---|---|---|
| $R^1$ | 1.21 | 7.00 | Base 10 Log | RQuadratic | 0.9992 |
| $R^2$ | 0.07 | 1.58 | Square Root | RQuadratic | 0.9991 |
| $R^3$ | 0.00 | 1.94 | Square Root | RQuadratic | 0.9704 |
| $R^4$ | 3.02 | 12.70 | None | RQuadratic | 0.9988 |
| $R^5$ | 0.02 | 0.98 | None | RQuadratic | 0.9992 |
| $R^6$ | 0.07 | 2.92 | None | RQuadratic | 0.9997 |
| $R^7$ | 16,872 | 945,957 | Inverse Sqrt | RQuadratic | 0.9958 |
| $R^8$ | 2,925 | 149,836 | Inverse Sqrt | RQuadratic | 0.9956 |
| $R^9$ | 0.919 | 0.981 | None | RQuadratic | 0.985 |
| $R^{10}$ | 0.394867 | 0.66209 | None | RQuadratic | 0.9998 |
| $R^{11}$ | 16,573 | 738,314 | Base 10 Log | RQuadratic | 0.9868 |
| $R^{12}$ | 2,770 | 98,782 | Base 10 Log | RQuadratic | 0.9805 |
| $R^{13}$ | 5 | 45 | Base 10 Log | RQuadratic | 0.8913 |
| $R^{14}$ | 0.927 | 0.983 | None | RQuadratic | 0.9936 |
| $R^{15}$ | 28 | 49.5 | None | RQuadratic | 0.9999 |
| $R^{16}$ | 28.1 | 48.3 | None | RQuadratic | 0.9998 |
| $R^{17}$ | 95 | 99.1 | None | RQuadratic | 0.994 |
| $R^{18}$ | 90.3 | 98 | None | RQuadratic | 0.9985 |
| $R^{19}$ | 28.4 | 49.5 | None | RLinear | 0.9995 |
| $R^{20}$ | 54.8 | 97.5 | None | RLinear | 0.9987 |
| $R^{21}$ | 2.15E+05 | 8.17E+05 | Base 10 Log | RQuadratic | 0.9999 |
| $R^{22}$ | 0.3 | 22.3 | Power | RQuadratic | 0.9886 |
| $R^{23}$ | 9.60E-02 | 8.03E+04 | Base 10 Log | RQuadratic | 0.9864 |
| $R^{24}$ | 2.27E-02 | 5.00E+04 | Base 10 Log | RQuadratic | 0.989 |
| $R^{25}$ | 1.96E-03 | 1.53E+04 | Base 10 Log | RQuadratic | 0.9838 |
| $R^{26}$ | 1.60E+01 | 1.91E+06 | Base 10 Log | RQuadratic | 0.9856 |
| $R^{27}$ | 1.60E+01 | 7.86E+05 | Base 10 Log | RQuadratic | 0.9865 |
| $R^{28}$ | 1.56E+01 | 1.88E+05 | Base 10 Log | RQuadratic | 0.9886 |

TABLE 4-continued

General Fits for Response Variables

| Response Variable | Minimum | Maximum | Transformation | Model Fit | Predicted R-Squared from ANOVA |
|---|---|---|---|---|---|
| $R^{29}$ | 1.19E+01 | 2.99E+04 | Base 10 Log | RQuadratic | 0.9908 |
| $R^{30}$ | 5.88E+00 | 4.18E+03 | Base 10 Log | RQuadratic | 0.9914 |

Figure 2:
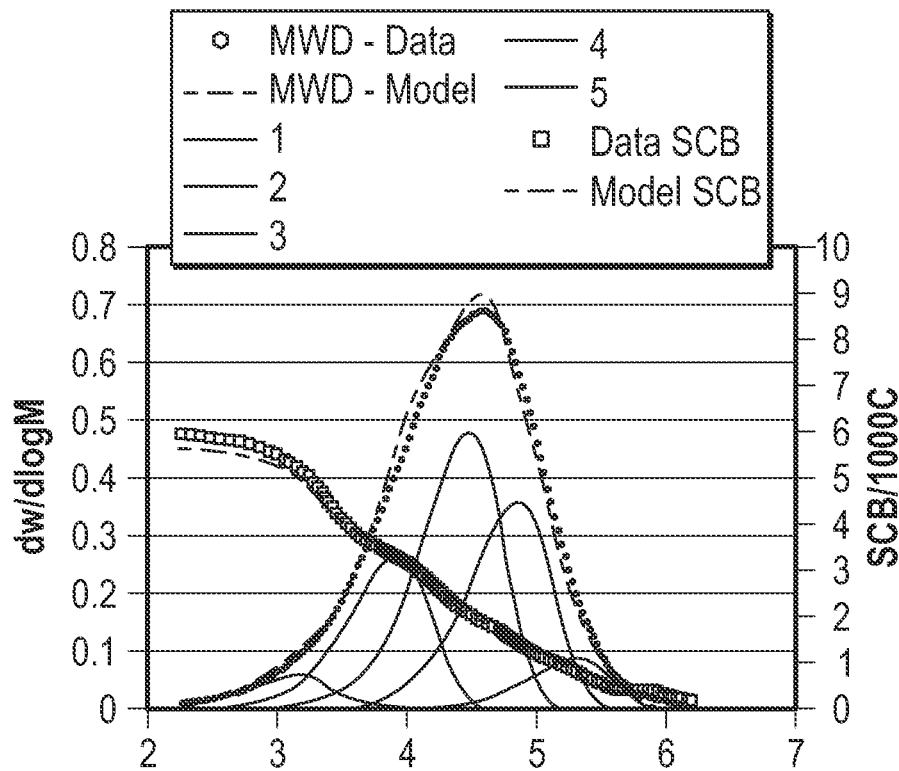
FIG. 2 illustrates the predicted and measured molecular weight distribution of an experimental polyolefin.

The fit for particular properties of a polyethylene produced in a bench scale process using 0.0106 grams of Cat B Ziegler Natta catalyst (TZ300 Ziegler Natta catalyst available from Total), 1 mL of a 1M solution of triethylaluminum (TEA), 0.056 lbmol/ft$^3$ ethylene concentration, a weight ratio of hexene to ethylene of 0.69, a molar hydrogen to ethylene ratio of 0.091, and 2 L of isobutane at a reactor temperature of 90° C. (outside of the DOE study) are further illustrated in FIGS. 2-4. First, FIG. 2 illustrates the process of FIG. 1 from stage 101 to 105 for a specific catalysis run under a set of reactor conditions for an experimental multisite catalyst in a single reactor. Specifically, FIG. 2 illustrates the measured molecular weight distribution (Data SCB) at particular reactor conditions against the fit (shown in a solid line) generated by the four sites generated from known kinetic equations. As FIG. 2 illustrates, kinetic equations offer an excellent fit to the experimental data. The site fractions of the catalyst used to model the molecular weight distribution and short chain branching are shown below:

TABLE 5

Catalyst Site Fractions

| Catalyst Site No. | Site Fraction |
|---|---|
| 1 | 0.100 |
| 2 | 0.483 |
| 3 | 0.298 |
| 4 | 0.088 |
| 5 | 0.031 |

Figure 3:
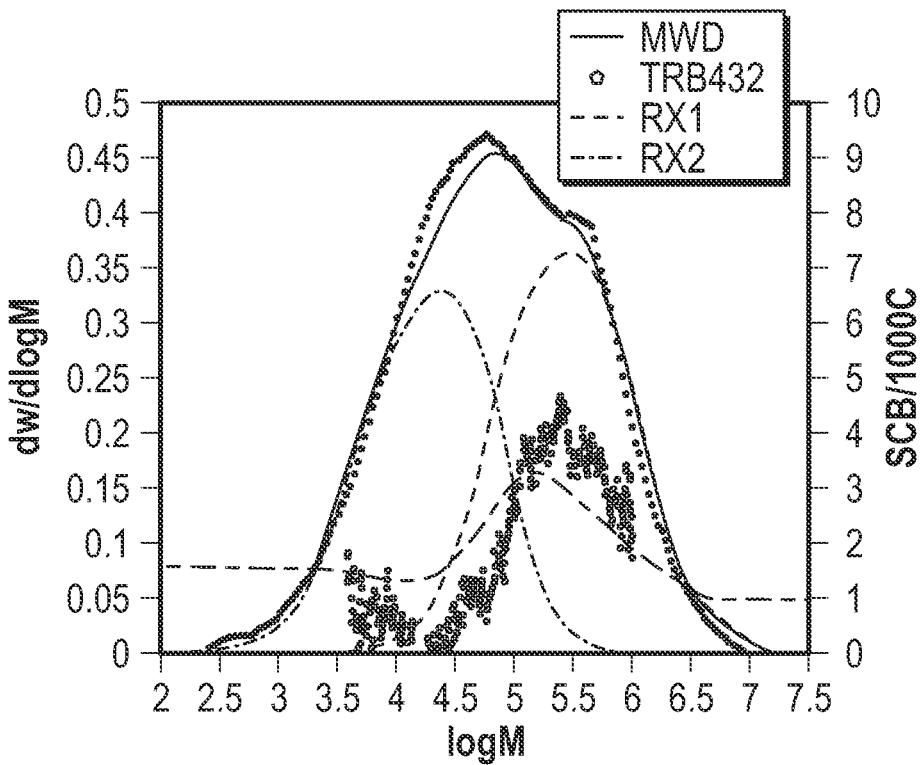
FIG. 3 illustrates the predicted and measured molecular weight and short chain branching of an experimental polyolefin.

Second, FIG. 3 illustrates the process of FIG. 1 from stage 101 to 105 for a specific catalysis run under a set of reactor conditions for an experimental multisite catalyst in a dual reactor system, as detailed in Table 4 below.

TABLE 6

Reactor Conditions

| Input Variable | Value |
|---|---|
| $I^1$ | 2.8 lb/hr (dry basis) |
| $I^2$ | 188° F. |
| $I^7$ | 75000 lb/hr |
| $I^3$ | 50 ppm |
| $I^4$ | 54000 lb/hr |
| $I^5$ | 37 lb/Mlb |
| $I^6$ | 0.008 lb/Mlb |
| $I^8$ | 188° F. |
| $I^{13}$ | 50000 lb/hr |
| $I^9$ | 50 ppm |
| $I^{10}$ | 48500 lb/hr |
| $I^{11}$ | 0.045 lb/Mlb |
| $I^{12}$ | 2.0 lb/Mlb |

Specifically, FIG. 3 illustrates the measured molecular weight and short chain branching (shown in circles) against the five sites generated from kinetic equations. For this multisite dual reactor model, the equations were based on the "method of moments" modeling techniques, which are described generally in Mastan et al., *Method of moments: A versatile tool for deterministic modeling of polymerization kinetics*, European Polymer J. 68 (2015) 139-160, which is incorporated herein by reference in its entirety. More specifically, for this model, a Bernoullian-like model was assumed for reaction equations. A variety of deactivation types were included in the general formulation that could be differentiated or assumed equal to one another, for each catalyst site type. The amount of each site type on a catalyst was considered an adjustable parameter, as was the fraction of potential sites relative to the catalyst weight.

The specific kinetic equations used are described in more detail below. For a single site, we included one activation reaction, where Cc is the un-activated catalyst site, T is the alkyl, and C is the activated site;

| | | |
|---|---|---|
| $Cc + T \to C$ | (activation) | $kk_a$ |

Deactivation (termination) reactions were modeled using the equations below, where $P_n^A$ is an active chain, n monomer units long, last added with monomer A or B (denoted by the superscript). $C_d$ is deactivated site. $P_n^D$ is a dead polymer chain, n monomer units long. C is as defined above. $C_h$ and $C_t$ are active catalyst sites originating from a hydrogen transfer or alkyl transfer;

| | | |
|---|---|---|
| $P_n^A \to C_d + P_n^D$ | (deactivation) | $k_{da}$ |
| $P_n^B \to C_d + P_n^D$ | (deactivation) | $k_{db}$ |
| $C \to C_d$ | (deactivation) | $k_d$ |
| $Ch \to C_d$ | (deactivation) | $k_{dh}$ |
| $Ct \to C_d$ | (deactivation) | $k_{dt}$ |

Initiation reactions were modeled using the equations below, where A and B are different olefin monomers, and $P_1^A$ and $P_1^B$ are the initial polymer growth with last monomer added either A and B.

| | | |
|---|---|---|
| $C + A \to P_1^A$ | (initiation) | $k_a$ |
| $C + B \to P_1^B$ | (initiation) | $k_b$ |
| $Ch + A \to P_1^A$ | (initiation) | $k_{ah}$ |
| $Ch + B \to P_1^B$ | (initiation) | $k_{bh}$ |
| $Ct + A \to P_1^A$ | (initiation) | $k_{at}$ |
| $Ct + B \to P_1^B$ | (initiation) | $k_{bt}$ |

Propagation reactions were modeled using the equations below.

| | | |
|---|---|---|
| $P_n^A + A \rightarrow P_{n+1}^A$ | (propagation of Monomer A on A terminated site) | $k_{pAA}$ |
| $P_n^A + B \rightarrow P_{n+1}^B$ | (propagation of Monomer B on A terminated site) | $k_{pAB}$ |
| $P_n^B + A \rightarrow P_{n+1}^A$ | (propagation of Monomer A on B terminated site) | $k_{pBA}$ |
| $P_n^B + B \rightarrow P_{n+1}^B$ | (propagation of Monomer B on B terminated site) | $k_{pBB}$ |

Transfer reactions and beta hydride elimination reactions were modeled using the equations below.

| | | |
|---|---|---|
| $P_n^A + A \rightarrow P_1^A + P_n^D$ | (Transfer to A Monomer on A terminated site) | $k_{tAA}$ |
| $P_n^A + B \rightarrow P_1^B + P_n^D$ | (Transfer to B Monomer on A terminated site) | $k_{tAB}$ |
| $P_n^B + A \rightarrow P_1^A + P_n^D$ | (Transfer to A Monomer on B terminated site) | $k_{tBA}$ |
| $P_n^B + B \rightarrow P_1^B + P_n^D$ | (Transfer to B Monomer on B terminated site) | $k_{tBB}$ |
| $P_n^A + H \rightarrow Ch + P_n^D$ | (Transfer to H on A terminated site) | $k_{tAH}$ |
| $P_n^B + H \rightarrow Ch + P_n^D$ | (Transfer to H on B terminated site) | $k_{tBH}$ |
| $P_n^A + T \rightarrow Ct + P_n^D$ | (Transfer to Al on A terminated site) | $k_{tAT}$ |
| $P_n^B + T \rightarrow Ct + P_n^D$ | (Transfer to Al on B terminated site) | $k_{tBT}$ |
| $P_n^A \rightarrow Ch + P_n^D$ | (Beta Hydride elimination on A terminated site) | $k_{tA(\beta)}$ |
| $P_n^B \rightarrow Ch + P_n^D$ | (Beta Hydride elimination on B terminated site) | $k_{tB(\beta)}$ |

In these equations, initial reactants include: the un-activated catalyst (Cc), ethylene (monomer A), comonomer olefin (monomer B), hydrogen (H), alkyl (T). As the reaction proceeds, polymer chains growth and become a reactant as well. The carrier solvent used in these reactions is isobutane (iC4). Differential rate equations for individual species can be written based on the concentration of the species, the concentration of the species they are reacting with (if appropriate) and a reaction rate constant, of the general form:

$$\frac{d[\text{species}]}{dt} = (\text{rate constant}) \prod (\text{concentration reactants})$$

For the polymer chains, there are many species, since each time a monomer is added it grows one monomer unit. Tracking each chain individually would be a very arduous task. At the same time, to obtain structural information, the distribution of chains needs to be tracked. This is handled by considering the moments for the distribution of chains, and formulating them into the differential rate equations. Shown below are the moment equations for each polymer in the reaction, the last added monomer being either A or B, or a dead (no longer active site) polymer, D, denoted by the superscript. The index, n, denoted the number of monomer units in the chain, and q denotes the moment (In our case we are interested in the $0^{th}$, $1^{st}$ and $2^{nd}$, as these will allow determination of the number average ($M_n = H_1/H_0$) and mass average ($M_w = H_2/H_1$) molecular weight. Equations for these moments are shown below:

$$H_q^{PA} = \sum_n n^q [P_n^A]$$

$$H_q^{PB} = \sum_n n^q [P_n^B]$$

$$H_q^{PD} = \sum_n n^q [P_n^D]$$

The differential with respect to time can be expressed for the moments, and the right side the differentiation can be brought inside the summation. Below, the moment for $P_n^A$ is shown as an example:

$$\frac{dH_q^{PA}}{dt} = \sum_n n^q \frac{d[P_n^A]}{dt}$$

Expression can then be written for $dP_n^A/dt$, $dP_n^B/dt$ and $dP_n^D/dt$, incorporating the individual species, summed according to the moments equations and reformulated. These formulations are shown in detail in appendix A. The result is a set of rate expressions involving each of the individual species concentrations, Cc, C, Ch, Ct, A, B, H, T, and the $0^{th}$, $1^{st}$ and $2^{nd}$ moment for polymer chains Last reacted with A, B or dead chains, D ($H_0^A$, $H_1^A$ and $H_2^A$, $H_0^B$, $H_1^B$ and $H_2^B$, $H_0^D$, $H_1^D$ and $H_2^D$. These equations are provided below.

$$\frac{dCc}{dt} = -ka[T][Cc]$$

$$\frac{dC}{dt} = -ka[C][A] - kb[C][B] - kd[C] + ka[T][Cc]$$

$$\frac{dCh}{dt} = -kah[Ch][A] - kbh[Ch][B] - kdh[Ch] +$$
$$kath[Ha0][H] + kbth[Hb0][H] + kats[Ha0] + kbts[Hb0]$$

$$\frac{dCt}{dt} = -kat[Ct][A] - kbt[Ct][B] - kdt[Ct] + katt[Ha0][T] + kbtt[Hb0][T]$$

$$\frac{dCd}{dt} = +kd[C] + kdh[Ch] + kdt[Ct] + kda[Ha0] + kdb[Hb0]$$

$$\frac{dA}{dt} = -ka[C][A] - kah[Ch][A] - kat[Ct][A] -$$
$$kpaa[Ha0][A] - kpba[Hb0][A] - kata[Ha0][A] - kbta[Hb0][A]$$

$$\frac{dB}{dt} = -kb[C][B] - kbh[Ch][B] - kbt[Ct][B] - kpab[Ha0][B] -$$
$$kpbb[Hb0][B] - katb[Ha0][B] - kbtb[Hb0][B]$$

$$\frac{dH}{dt} = -kath[Ha0][H] - kbth[Hb0][H]$$

$$\frac{dT}{dt} = -katt[Ha0][T] - kbtt[Hb0][T] - ka[T][Cc]$$

$$\frac{dHa0}{dt} = +ka[C][A] + kah[Ch][A] + kat[Ct][A] -$$
$$kpab[B][Ha0] + kpba[A][Hb0] - katb[B][Ha0] + kbta[Hb0] -$$
$$kath[H][Ha0] - katt[T][Ha0] - kats[Ha0] - kda[Ha0]$$

$$\frac{dHb0}{dt} = +kb[C][B] + kbh[Ch][B] + kbt[Ct][B] - kpba[A][Hb0] +$$
$$kpab[B][Ha0] - kbta[A][Hb0] + katb[B][Ha0] -$$
$$kbth[H][Hb0] - kbtt[T][Hb0] - kbts[Hb0] - kdb[Hb0]$$

$$\frac{dHd0}{dt} = +kata[Ha0][A] + kbta[Hb0][A] + katb[Ha0][A] +$$
$$kbtb[Hb0][B] + kath[Ha0][H] + katt[Ha0][T] + kats[Ha0] +$$
$$kda[Ha0] + kbth[Hb0][H] + kbtt[Hb0][T] + kbts[Hb0] + kdb[Hb0]$$

-continued $$\frac{dHa1}{dt} = +ka[C][A] + kah[Ch][A] + kat[Ct][A] +$$

$$kpaa[Ha0][A] - kpab[Ha1][B] + kpba[A][[Hb1] + Hb0]] +$$

$$kata[A](-[Ha1] + [Ha0]) + kbta[A][Hb0] - katb[B][Ha1] -$$

$$kath[H][Ha1] - katt[T][Ha1] - kats[Ha1] - kda[Ha1]$$

$$\frac{dHb1}{dt} = +kb[C][B] + kbh[Ch][B] + kbt[Ct][B] +$$

$$kpbb[Hb0][B] - kpba[Hb1][A] + kpab[B]([Ha1] + [Ha0]) +$$

$$kbtb[B](-[Hb1] + [Hb0]) + katb[B][Ha0] - kbta[A][Hb1] -$$

$$kbth[H][Hb1] - kbtt[T][Hb1] - kbts[Hb1] - kdb[Hb1]$$

$$\frac{dHd1}{dt} = +kata[Ha1][A] + kbta[Hb1][A] + katb[Ha1][A] +$$

$$kbtb[Hb1][B] + kath[Ha1][H] + katt[Ha1][T] + kats[Ha1] +$$

$$kda[Ha1] + kbth[Hb1][H] + kbtt[Hb1][T] + kbts[Hb1] + kdb[Hb1]$$

$$\frac{dHa2}{dt} = +ka[C][A] + kah[Ch][A] + kat[Ct][A] +$$

$$kpaa[A][(2[Ha1] + [Ha0]) - kpab[B][Ha2] + kpba[A]([Hb2] + 2[Hb1] +$$

$$[Hb0]) - kata[A]([Ha2] - [Ha0]) + kbta[A][Hb0] - katb[B][Ha2] -$$

$$kath[H][Ha2] - katt[T][Ha2] - kats[HA2] - kda[Ha2]$$

$$\frac{dHb2}{dt} = +kb[C][B + kbh[Ch][B] + kbt[Ct][B] +$$

$$kpbb[B][(2[Hb1] + [Hb0]) - kpba[A][Hb2] + kpab[B]([Ha2] +$$

$$2[Ha1] + [Ha0]) - kbtb[B][([Hb2] - [Hb0]katb[B][Ha0] -$$

$$kbta[A][Hb2] - kbth[H][Hb2] - kbtt[T][Hb2] - kbts[Hb2] - kdb[Hb2]$$

$$\frac{dHd2}{dt} = +kata[Ha2][A] + kbta[Hb2][A] + katb[Ha2][A] +$$

$$kbtb[Hb2][B] + kath[Ha2][H] + katt[Ha2][T] + kats[Ha2] +$$

$$kda[Ha2] + kbth[Hb2][H] + kbtt[Hb2][T] + kbts[Hb2] + kdb[Hb2]$$

As one of skill in the art would readily understand, with each species reaction rate formulated, one can arrive at a molecular balance equation for each species given the reactor system. With set of initial conditions, the resulting set of equations can then be numerically solved simultaneously to obtain species' concentrations as a function of time.

For a batch reactor, the relative equations are simply those written above without additional terms. For a semi-batch bench scale reactor, the same is true, except, for the components that are continuously feed to the reactor to maintain constant concentration (for example C2=). For those, the differential with respect to time is set equal to zero.

For an ideal CSTR, one needs to add terms for the input and exit of components. An example for generic component "X" is given below:

$$\frac{dX}{dt} = (\text{reaction rates}) + \frac{1}{\tau}(X_{F0} - X) \qquad (6)$$

Where $\tau$ is the average residence time=$V/v_0$ (V=reactor volume and v0=volume flow).

For multiple sites, we arrived at 5 sites (resulting in 5 Shultz Flory distributions) as a best fits of the MWD for the for the ZN catalyst we used (as shown in FIG. 2), we added differential equations for each additional site. So, for each site, there would be a set of differential equations as given above. These equations coupled with a differential mass balances were solved simultaneously using a MATLAB program to obtain the amounts of each species and the moments associated with each site. (The method gives the species as a function of time.) From the different moments, one can then obtain the amount of each Shultz-Flory and its number average molecular weight. The resulting equations also allow calculation of the amount of comonomer in each which also allows calculation of the SCB for each SF. At this point, we can linearly add the amount of each SF to get the overall MWD and SCB.

This method get to the same results as the close form equation method (described in DesLauriers) if one uses multi-sites there, but for certain reactor configurations (namely the a dual loop reactor configuration), this moment method may be easier to implement. To obtain the kinetic coefficients we did several lab reactions (set up in a designed experiment), deconvolved the resulting MWD and SCB from the experiments and fit the model parameters to the data. We then verified this model by running different reactor conditions in the pilot plant in ADL mode. These data were used as input at stage 101 in FIG. 1.

In FIG. 3, the fit for the molecular weight distribution is shown in a solid line, while the fit for the short chain branching distribution is shown in a dotted line. As FIG. 3 illustrates, kinetic equations offer an excellent fit to the experimental data.

Figure 4:
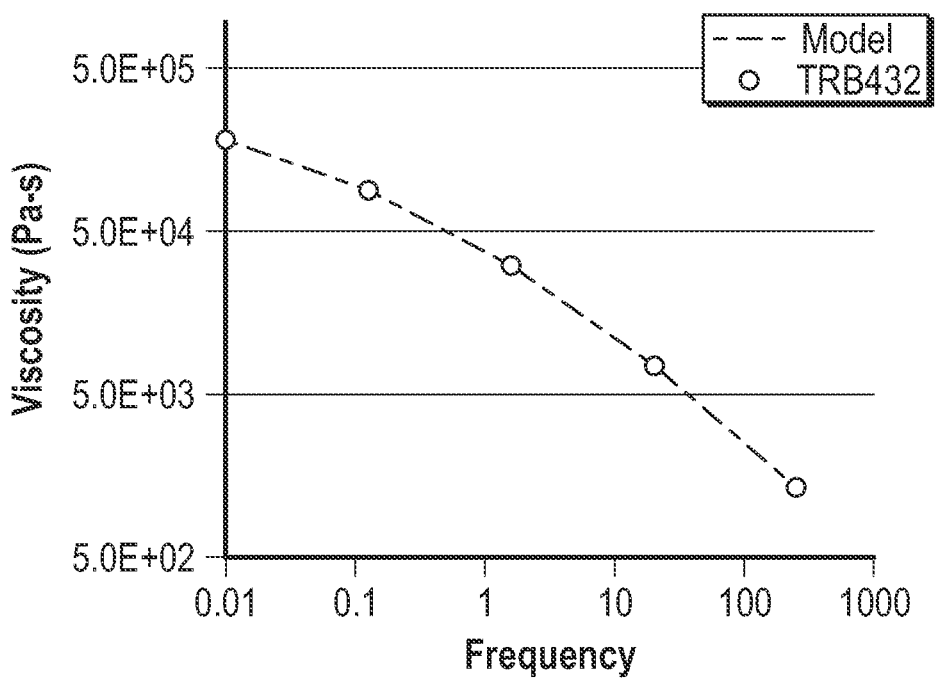
FIG. 4 illustrates the predicted and experimental viscosity of an experimental polyolefin.

Third, FIG. 4 illustrates the process of FIG. 1 from stage 105 to 107 for a viscosity curve from a model that uses the molecular weight distribution compared to data as input. In this figure, the molecular weight distribution predicted from Soares type method of moments models was used as input to the rheology model to obtain the viscosity curve properties. As one of skill in the art would readily understand, models could be obtained which use molecular weight distribution and hsort chain branching input to obtain a variety of predictions for properties such as density, PSP2, PSP3*, HLMI, I-10, MI, and the like. Specifically, FIG. 4 illustrates the experimental viscosity data (shown as circles) and the predicted viscosity curve (shown as a solid line). As FIG. 4 illustrates, the viscosity model exhibited an excellent fit for experimental viscosity data.

There is a substantial body of work reported in the literature describing the dependence of rheological properties of entangled melts on their molecular weight distribution, as described, for example in (1) M. Rubinstein and R. H. Colby, *J. Chem. Phys.*, vol. 89, no. 8, p. 5291, 1988; (2) d. Cloizeaux, *Macromolecules*, vol. 23, p. 4678, 1990; (3) S. H. Wasserman and W. W. Graessley, *J. Rheol.*, vol. 36, no. 2, p. 543, 1992; (4) J. S. Fodor, Ph.D. Thesis: Application of Normal-Mode Microdielectrometry Towards Investigation od Diffusion and Flow-Induced Phenomena in Polymer Melts, Notre Dame, Ind.: University of Notre Dame, 1995; and (5) J. S. Fodor, J. R. Huljak and D. A. Hill, "Dielectric and viscoelastic normal-mode relaxation in entangled, polydisperse cis-polyisoprene melts," *The Journal of Chemical Physics*, vol. 103, no. 13, pp. 5725-5734, 1995; each of which. Theory and modeling has been developed allowing very reasonable prediction of the rheological properties of a melt based on knowledge of its molecular weight distribution and correlation between the polymer's relaxation time and molecular weight. Several models have been developed based on some form of reptation theory and mixing rules that account for the polydispersity of the system (references). It has been found that very reasonable predictions can be obtained using a double reptation model for the relaxation and a Tsenoglou mixing rule, as described in C. Tsenoglou, *Macromolecules*, vol. 24, p. 1792, 1991, which is incorporated herein by reference in its entirety. This combination may be used to obtain predictions for the rheology based on the molecular weight distribution.

The shear relaxation modulus, G(t), knowing the autocorrelation function for momentum in a polymer melt, Ψ(t), is given by, where $G_p$ is the plateau modulus, $$\frac{G(t)}{G_p} = \Psi(t) \quad (25)$$

The storage and loss modulus can then be calculated, $$G'(\omega) = \omega \int_0^\infty G(t)\sin(\omega t)dt$$

$$G''(\omega) = \omega \int_0^\infty G(t)\cos(\omega t)dt$$

As would be readily understood by one of skill in the art, the Tsenoglou mixing rule takes into account the interaction of the mixture of molecular weights and the chain relaxation dynamics, it is given by the following, where, $\zeta_j$, are the fraction of molecular weight species, and $\psi(t, \tau_j)$ is the relaxation function for each species as a function of its characteristic relaxation time, $\tau_j$.

$$\Psi(t) = \left[\sum_{j=1}^n \zeta_j \psi(t, \tau_j)^{1/2}\right]^2$$

$$\zeta_j = \Delta\log M \cdot MWD(M_j)$$

Next, $hh_j$ is defined as a ratio of the species molecular weight relative to a reference molecular weight, M*.

$$hh_j = \frac{M_j}{M^*}$$

Without intending to be bound by any particular theory, it is believed, based on literature data, that the relaxation time varies with molecular weight to a power. For polyethylene, and in this work, 3.4 was found to be appropriate, (τ*=0.00013 s, M*=40000 g/mol, Gp=1.34×10⁶ Pa).

$$\tau_j = \tau^* \cdot hh_j^{3.4}$$

Double reptation attempts to account for the reptation of the individual chains within the melt as constrained by the melt entanglements, as well as the relaxation of the entanglements themselves. This yields the following form for the individual species autocorrelation function, $$\psi(t, \tau_j) = \left(\frac{8}{\pi^2}\sum_{\substack{p=1 \\ odd}}^\infty \frac{1}{p^2} e^{-p^2 \frac{t}{\tau_j}}\right)^2$$

The equations for G'(ω) and G''(ω) can be transformed to the following which as easier to integrate:

$$G'(\omega) = \int_0^\infty F\left(\frac{z}{\omega}\right)\sin(z)dz$$

$$G''(\omega) = \int_0^\infty F\left(\frac{z}{\omega}\right)\cos(z)dz$$

These equations can be then evaluated given the molecular weight distribution, and choosing appropriate values for the adjustable parameters, M* and τ*. Methods used to simplify the integration are described elsewhere, such as in J. S. Fodor, Ph.D. Thesis: Application of Normal-Mode Microdielectrometry Towards Investigation od Diffusion and Flow-Induced Phenomena in Polymer Melts, Notre Dame, Ind.: University of Notre Dame, 1995.

Once G' and G" are calculated, the complex viscosity can be obtained, $$\eta^*(\omega) = \frac{(G'(\omega)^2 + G''(\omega)^2)^{1/2}}{\omega}$$

Next, the melt index properties were predicted using the viscosity curve results discussed above. While there are known correlations between average molecular weight and melt index measurement, there is not a tight theoretical basis for these correlations, and without beinb bound by any particular theory, it is believed that these correlations may lose accuracy as the molecular distribution changes from the standard distribution shape which was used when the correlation was developed.

In order to retain as much as possible from the viscosity prediction, melt index predictions may be obtained by first fitting the viscosity curves to a Careau-Yasada model, and then using that model in a computational fluid dynamics simulation (such as with COMSOL Multiphysics®) to model the flow in a melt index device. Having the flow profile and the melt density at the exit, one of skill in the art could then integral over the exiting surface to obtain the amount of material leaving the surface in 10 minutes. Changing the pressure driving force in the model to match the weights used in the machine allows the different melt index values to be predicted.

The geometry of the melt index die was reproduced in the CFD simulation according to dimensions given in the ASTM D1238-13. The diameter of the die was set at 2.095 mm and its length was set at 8 mm. The barrel diameter was set slightly less than the barrel foot dimension at 9 mm. (The given dimension was 9.4742 mm, but was adjusted slightly in an attempt to obtain a prediction that better match initial fits.) The barrel length dimensions were considered less critical. Without intending to be bound by any particular theory, it was believed that the length needed to be long enough that a steady state developed flow could be assumed through the entrance to the die, so 10 mm was chosen as the die length. We tested values higher and lower than 10 mm, and showed the prediction to be minimally sensitive to this dimension.

The pressure imparting the flow was calculated from knowing the weight used in the measurement divided by the surface area, $$P_{MI} = \text{Weight} * \left(\frac{9.8}{\pi * D^2/4}\right)$$

The weight used here dictated the type of melt index: 2.16 kg for MI, 21.6 kg for HLMI, for example. The weight and geometry could be manipulated to match any type of melt index measure desired.

The melt index machine is generally run at 190° C. for polyethylene, however, we added temperature dependence if we ever wanted to model an index at a different temperature. The following expression was used for the melt density, $\rho_m$, where T is the temperature in degrees Celsius in the die, $$\rho_m = 863.79 - 0.5126*(T)$$

The modeling required a constitutive equation relating the stress strain behavior of the fluid. For this, the Careau-Yasada (CY) model was fit to the viscosity curve for the sample under consideration. In general, a reasonable fit was found for the generated curves. If needed or desired, multiple CY models could be used. (The parameter, n, in the model was set at 0.1818. This yielded reasonable fits, yet removed one parameter in the fitting routine. If desired it could be left as an adjustable parameter when fitting the viscosity curve)

$$\eta = \eta_0 * (1 + (\omega \tau_\eta)^a)^{\frac{n-1}{a}}$$

The melt index measurement was then predicted by integrating the velocity profile over the surface of the die, multiplying by the density, and configuring the units to equal g/10 min.

A number of validation experiments were conducted using various weight ratios of 1-hexene to ethylene and concentrations of ethylene, as illustrated in FIG. 4. The model was found to fit data well for both primary and derivative responses (within a 95% predictive interval limit) for 7 of the 9 samples. The response surface models are illustrated in FIGS. 6 and 7. For both FIGS. 6 and 7, the 1-hexene to ethylene ratio, temperature, and time were set to 0.4, 130° C., and 4 minutes, respectively.

Several examples using a dual reactor system to evaluate the forward response surface method across a wide variety of variables and conditions are given below. The input variables and values selected for these experiments are shown in Tables 7 and 8 below.

TABLE 7

Input Variables

| Input Variable | Experiment 1 | Experiment 2 | Experiment 3 | Experiment 4 | Experiment 5 |
|---|---|---|---|---|---|
| $I^1$ | 184 | 184 | 184 | 184 | 184 |
| $I^2$ | 0 | 0 | 0 | 0 | 0 |
| $I^3$ | 0 | 1 | 1 | 1 | 1 |
| $I^4$ | 45 | 45 | 30 | 45 | 30 |
| $I^5$ | 0.067 | 0.007 | 0.007 | 0.007 | 0.007 |
| $I^6$ | 0 | 0 | 0 | 0 | 0 |
| $I^7$ | 72 | 50 | 50 | 50 | 72 |
| $I^8$ | 184 | 184 | 184 | 190 | 208 |
| $I^9$ | 0.620 | 0.5 | 0.5 | 1.25 | 0.5 |
| $I^{10}$ | 30 | 30 | 45 | 45 | 30 |
| $I^{11}$ | 0.015 | 0 | 0 | 45 | 30 |
| $I^{12}$ | 0.0002 | 0.0002 | 0.0002 | 0.001 | 0.0008 |
| $I^{13}$ | 72 | 72 | 50 | 50 | 72 |

The response variables selected for these experiments included the weight average molecular weight of the first reactor ($M_w$ RX-1), mole average molecular weight of the first reactor ($M_n$ RX-1), density of the product of the first reactor (RX-1 density) in g/cm³, the weight fraction of the final product (the product of the second reactor) which emerges from the first reactor (wt. frac. RX-1), the weight average molecular weight of the product of the second reactor (Blend $M_w$), the molar average molecular weight of the product of the second reactor (Blend $M_n$), the PDI of the product of the second reactor (Blend PDI), the density of the product of the second reactor (Blend Density) in g/cm³, High Load Melt Index (HLMI) of the product of the second reactor, the melt flow index (I10) of the product of the second reactor, and the melt flow index (MI) in g/mL.

TABLE 8

Response Variables and Values for Experiment 1

| Response Variable | Observed Value | RSM Predicted Value | 95% PI Low | 95% PI high |
|---|---|---|---|---|
| $R^7$ | 52,160 | 29,966 | 27,494 | 32,788 |
| $R^8$ | 5,710 | 5,712 | 5,175 | 6,339 |
| $R^9$ | 0.962 | 0.964 | 0.959 | 0.969 |
| $R^{10}$ | — | 0.610 | 0.608 | 0.611 |
| $R^{11}$ | 58,730 | 36,681 | 29,060 | 46,301 |
| $R^{12}$ | 5,930 | 7,951 | 6,341 | 9,969 |
| $R^{13}$ | 9.9 | 7.0 | 5.0 | 10.0 |
| $R^{14}$ | 0.961 | 0.959 | 0.957 | 0.961 |
| $R^{23}$ | >500 | >500 | — | — |
| $R^{24}$ | >500 | >500 | — | — |
| $R^{25}$ | >500 | 127 | 43.5 | 370 |

TABLE 9

Response Variables and Values for Experiment 2

| Response Variable | Observed Value | RSM Predicted Value | 95% PI Low | 95% PI high |
|---|---|---|---|---|
| $R^7$ | 96,950 | 50,012 | 45,010 | 55,898 |
| $R^8$ | 13,650 | 9,092 | 8,078 | 10,309 |
| $R^9$ | — | 0.966 | 0.962 | 0.970 |
| $R^{10}$ | — | 0.617 | 0.616 | 0.619 |
| $R^{11}$ | 119,240 | 91,192 | 72,471 | 114,749 |
| $R^{12}$ | 14,000 | 13,455 | 10,802 | 16,761 |
| $R^{13}$ | 8.5 | 6.0 | 4.0 | 9.0 |
| $R^{14}$ | 0.955 | 0.961 | 0.959 | 0.963 |
| $R^{23}$ | 190.5 | 297 | 133 | 665 |
| $R^{24}$ | 48.18 | 47.2 | 21.9 | 102 |
| $R^{25}$ | 4.67 | 3.83 | 1.38 | 10.6 |

TABLE 10

Response Variables and Values for Experiment 3

| Response Variable | Observed Value | RSM Predicted Value | 95% PI Low | 95% PI high |
|---|---|---|---|---|
| $R^7$ | 177,900 | 120,554 | 102,294 | 144,179 |
| $R^8$ | 27,940 | 23,323 | 19,298 | 28,753 |
| $R^9$ | 0.953 | 0.951 | 0.946 | 0.955 |
| $R^{10}$ | — | 0.421 | 0.420 | 0.423 |
| $R^{11}$ | 184,830 | 200,870 | 159,133 | 253,553 |
| $R^{12}$ | 35,730 | 25,027 | 20,022 | 31,284 |
| $R^{13}$ | 5.2 | 9.0 | 6.0 | 13.0 |
| $R^{14}$ | 0.956 | 0.955 | 0.953 | 0.957 |
| $R^{23}$ | 11.34 | 16.1 | 7.15 | 36.3 |
| $R^{24}$ | 3.08 | 2.28 | 1.05 | 4.99 |
| $R^{25}$ | 0.34 | 0.14 | 0.05 | 0.39 |

TABLE 11

Response Variables and Values for Experiment 4

| Response Variable | Observed Value | RSM Predicted Value | 95% PI Low | 95% PI high |
|---|---|---|---|---|
| $R^7$ | 140,590 | 132,076 | 111,581 | 158,782 |
| $R^8$ | 20,100 | 23,083 | 19,180 | 28,311 |
| $R^9$ | 0.960 | 0.951 | 0.947 | 0.956 |
| $R^{10}$ | — | 0.522 | 0.521 | 0.524 |
| $R^{11}$ | 100,330 | 156,140 | 125,110 | 194,868 |
| $R^{12}$ | 11,100 | 19,693 | 16,066 | 24,140 |
| $R^{13}$ | 9.0 | 8.0 | 6.0 | 11.0 |
| $R^{14}$ | 0.964 | 0.957 | 0.955 | 0.959 |
| $R^{23}$ | 342.8 | 117 | 54.9 | 250 |
| $R^{24}$ | 88.5 | 12.5 | 5.89 | 26.6 |
| $R^{25}$ | 9.32 | 0.35 | 0.13 | 0.90 |

TABLE 12

Response Variables and Values for Experiment 5

| Response Variable | Observed Value | RSM Predicted Value | 95% PI Low | 95% PI high |
|---|---|---|---|---|
| $R^7$ | 578,100 | 516,451 | 372,039 | 764,714 |
| $R^8$ | 114,500 | 98,964 | 68,058 | 156,923 |
| $R^9$ | 0.922 | 0.924 | 0.919 | 0.928 |
| $R^{10}$ | — | 0.604 | 0.602 | 0.605 |
| $R^{11}$ | 429,610 | 318,559 | 252,428 | 402,015 |
| $R^{12}$ | 13,960 | 25,881 | 20,761 | 32,264 |
| $R^{13}$ | — | 12.0 | 8.0 | 18.0 |
| $R^{14}$ | 0.944 | 0.940 | 0.938 | 0.942 |
| $R^{23}$ | — | 8.78 | 3.84 | 20.1 |
| $R^{24}$ | — | 0.687 | 0.311 | 1.52 |
| $R^{25}$ | 0.94 | 0.06 | 0.02 | 0.16 |

Figure 5:
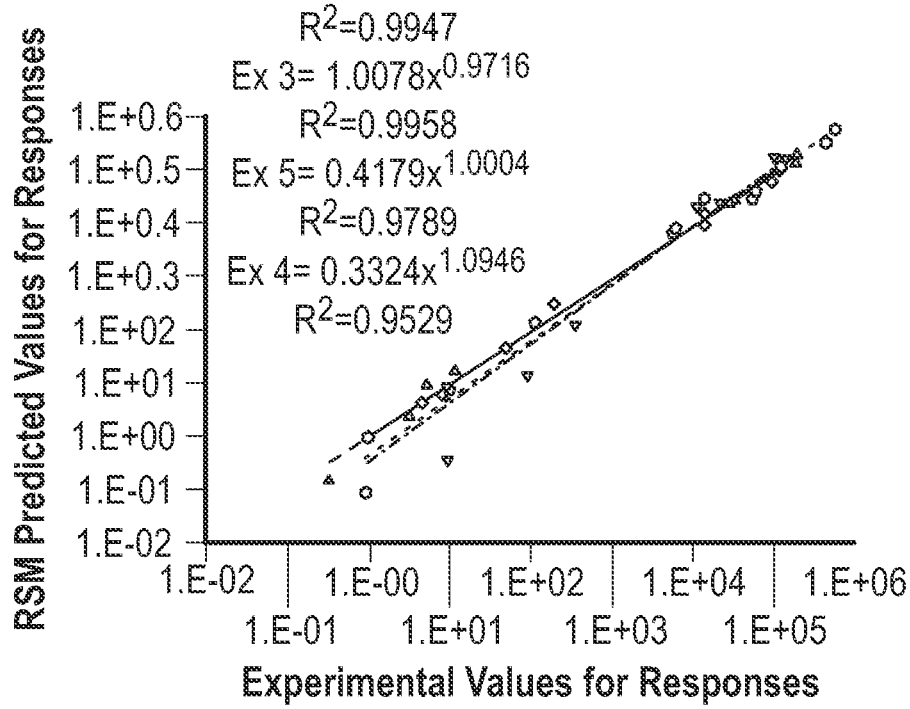
FIG. 5 illustrates the fit of observed experimental data against predicted RSM values, according to an embodiment of the present disclosure.

The excellent correlations between the observed experimental values and the RSM predicted values of these response variables are illustrated in FIG. 5.

Next, using the RSM, a reverse model was generated, to select response targets and solve for the necessary polymerization conditions to meet those targets, using numerical optimization functions contained in RSM software (step 113 in FIG. 1).

Example 3—Reverse Model Using the Response Surface Method with a Virtual Reactor Next, an optimization/reverse prediction was conducted for a virtual dual reactor system using the RSM model and the desirability functions (step 115 in FIG. 1). First, a set of set reactor variables were selected, as shown below. These variables indicate that the desired reactor temperatures are 188° F., that it is desired to minimize the amount of hydrogen added to the first reactor, and that it is desired not to add any hexene to the second reactor.

TABLE 13

Set Reactor Variables and Values

| Set Variable | Variable Description | Targeted Value |
|---|---|---|
| $I^2$ | Temperature of Reactor 1 | 188° F. |
| $I^8$ | Temperature of Reactor 2 | 188° F. |
| $I^6$ | Weight ratio of hydrogen to ethylene in Reactor 1 | minimum |
| $I^{11}$ | Weight ratio of hexene to ethylene in Reactor 2 | 0 |

Next, a set of desired polymer properties were gathered, including the weight average molecular weight of the first reactor ($M_w$ RX-1), mole average molecular weight of the first reactor ($M_n$ RX-1), density of the product of the first reactor (RX-1 density) in g/cm³, the weight fraction of the final product (the product of the second reactor) which emerges from the first reactor (wt. frac. RX-1), the weight average molecular weight of the product of the second reactor (Blend $M_w$), the molar average molecular weight of the product of the second reactor (Blend $M_n$), the PDI of the product of the second reactor (Blend PDI), the density of the product of the second reactor (Blend Density) in g/cm³, and productivity of the second reactor (Productivity RX-2), as detailed in the table below.

TABLE 14

Desired Polymer Properties and Values

| Selected Input Variable | Description | Desired Value |
|---|---|---|
| $R^7$ | $M_n$ RX-1 (g/mol) | 114,000 |
| $R^8$ | $M_w$ RX-1 (g/mol) | 619,000 |
| $R^9$ | RX-1 density (g/cm³) | 0.926 |
| $R^{10}$ | wt. frac. RX-1 | 0.53 |
| $R^{12}$ | Blend $M_n$ | 8,200 |
| $R^{11}$ | Blend $M_w$ | 41,500 |
| $R^{14}$ | Blend Density (g/cm³) | 0.948 |
| $R^{20}$ | Productivity RX-2 (lb/hr) | 99,100 |

The system inputs in Table 15 above were all set to stay within a model range. The desired polymer properties and values were then input into both MATLAB® and Stat-Ease® models, which returned a variety of possible solutions for reactor parameters, ranked by desirability. The most desirable values of the targeted variables are shown below:

TABLE 15

Calculated values of Reactor Parameter Variables

| Targeted Input Variable | Description | MATLAB Reverse RSM Caluclated Value | Stat-Ease Reverse RSM Calculated Value |
|---|---|---|---|
| $I^2$ | Temperature of Reactor 1 | 188° F. | 188° F. |
| $I^8$ | Temperature of Reactor 2 | 188° F. | 189° F. |
| $I^6$ | Weight ratio of hydrogen to ethylene in Reactor 1 | 2.0 | 0.7 |
| $I^{11}$ | Weight ratio of hexene to ethylene in Reactor 2 | 0.045 | 2.44 |

While the disclosed method is adaptable to any system, it may be particularly helpful in systems having a higher level of complexity. For example, the disclosed method is also applicable in the ADL system where it may eliminate the need for a fluff sample on the first reactor for normal process monitoring and decrease the time to come on specification. The fluff sample from the outlet of the purge column (a normal safe sample point for fluff) may be analyzed with dynamic rheology to determine what adjustments are needed to the process to move the molecular weight distribution in the desired direction. The HMW (high molecular weight) polymer will dominate the low sheer region of the rheology curve and the low molecular weight polymer will dominate the high sheer region of the dynamic rheology. Differences in the dynamic rheology from the target across the range of sheer rate provide insights into deficiencies in molecular weight and in the composition ratio. Since each polymer is produced in separate reactor, the adjustments to the overall bimodal polymer are made in the respective reactor producing the portion of the polymer that requires adjustment. In another aspect, this methodology can be used to improve chrome resins systems property control by linking the process parameters to changes in the amount of LCB in the resin along with the normally monitored resin properties all combined into a method as described above.

In a further aspect, the disclosed method may be utilized to manage the transition from one type resin to a different type of resin in a plant. For example, this method may be applied to manage the direct the transition from a bimodal ADL film resin to the bimodal ADL pipe resin, or from a bimodal ADL pipe resin to a bimodal ADL film resin. This transition may require, for example, making a slight adjustments to the molecular weight distribution, and the disclosed technique can reduce transition times because a model may be tailored to the specific transitions. Such methods may provide more flexibility of a system, reduce the amount of off-spec resin, provide a significant impact on financial performance at the scale of a system.

Aspects

The invention is described above with reference to numerous aspects and aspects, and specific examples. Many variations will suggest themselves to those skilled in the art in light of the above detailed description. All such obvious variations are within the full intended scope of the appended claims. Other aspects of the invention can include, but are not limited to, the following (aspects typically are described as "comprising" but, alternatively, can "consist essentially of" or "consist of" unless specifically stated otherwise)

According to a first aspect of the present disclosure, a method of controlling an olefin polymerization reactor system is provided, the method comprising: a) selecting n input variables $I^1, I^2, I^3, \ldots I^n$, each input variable corresponding to a process condition for an olefin polymerization process; b) identifying m response variables, $R^1, R^2, R^3, \ldots R^m$, each response variable corresponding to a measurable polymer property, wherein two of the m response variables are molecular weight distribution (MWD) and short chain branching (SCB); c) adjusting one of more of the n input variables $I^1$ to $I^n$ in a plurality of polymerization reactions using the olefin polymerization reactor system, to provide a plurality of olefin polymers and measuring each of the m response variables $R^1$ to $R^m$ as a function of the input variables for each olefin polymer; d) analyzing the change in each of the response variables $R^1$ to $R^m$ as a function of the input variables $I^1$ to $I^n$ to determine the coefficients according to the following general equation for each response variable $R^1$ to $R^m$:

$$R^{1-m} = C^0 + \sum_{u=1}^{u=n} C^u(I^u)$$

e) calculating a Response Surface Model (RSM) using general equations for each response variable $R^1$ to $R^m$ ($R^{1-m}$) determined in step d) to correlate any combination of the n input variables $I^1$ to $I^n$ with one or more of m response variables $R^1$ to $R^m$; f) applying n selected input variables $I^{s1}, I^{s2}, I^{s3}, \ldots I^{sn}$ to the calculated Response Surface Model (RSM) to predict one or more of m target response variables, $R^{t1}, R^{t2}, R^{t3}, \ldots R^{tm}$, each target response variable corresponding to a measurable polymer property; and g) using the n selected input variables $I^{s1}$ to $I^{sn}$ to operate the olefin polymerization reactor system and provide a polyolefin product.

According to a second aspect of the present disclosure, a method according to the first aspect is provided, wherein the general equation for each response variable $R^1$ to $R^m$ is $$R^{1-m} = C^0 + \sum_{u=1}^{u=n} C^u(I^u) + \sum_{v=1}^{v'} C^v(\text{product of a unique combination of 2 of } I^1 \text{ to } I^n, \text{ independently selected})$$

wherein v' is the total number of unique combinations of any 2 of $I^1$ to $I^n$, independently selected.

According to a third aspect of the present disclosure, a method according to the first aspect is provided, wherein the general equation for each response variable $R^1$ to $R^m$ is $$R^{1-m} = C^0 + \sum_{u=1}^{u=n} C^u(I^u) + \sum_{v=1}^{v'} C^v(\text{product of a unique combination of 2 of } I^1 \text{ to } I^n, \text{ independently selected}) + \sum_{w=1}^{w'} C^w(\text{product of a unique combination of 3 of } I^1 \text{ to } I^n, \text{ independently selected})$$

wherein v' is the total number of unique combinations of any 2 of $I^1$ to $I^n$, independently selected; and w' is the total number of unique combinations of any 3 of $I^1$ to $I^n$, independently selected.

According to a fourth aspect of the present disclosure, a method according to the first aspect is provided, wherein the general equation for each response variable $R^1$ to $R^m$ is $$R^{1-m} = C^0 + \sum_{u=1}^{u=n} C^u(I^u) + \sum_{v=1}^{v'} C^v(\text{product of a unique combinaiton of 2 of } I^1 \text{ to } I^n, \text{ independently selected}) + \sum_{w=1}^{w'} C^w(\text{product of a unique combination of 3 of } I^1 \text{ to } I^n, \text{ independently selected}) + \sum_{x=1}^{x'} C^x(\text{product of a unique combination of 4 of } I^1 \text{ to } I^n, \text{ independently selected})$$

wherein v' is the total number of unique combinations of any 2 of $I^1$ to $I^n$, independently selected; w' is the total number of unique combinations of any 3 of $I^1$ to $I^n$, independently selected; and x' is the total number of unique combinations of any 4 of $I^1$ to $I^n$, independently selected.

According to a fifth aspect of the present disclosure, a method according to any one of the first to fourth aspects is provided, further comprising the steps of: h) measuring one or more properties of the polyolefin product corresponding to m measured response variables, $R^{m1}, R^{m2}, R^{m3}, \ldots R^{mm}$;

and i) repeating steps a) through h) to reduce the difference between the target response variables $R^{r1}$ to $R^{rm}$ and the measured response variables $R^{m1}$ to $R^{mm}$.

According to a sixth aspect of the present disclosure, a method according to any one of the first to fifth aspects is provided, wherein the step of d) analyzing the change in each of the response variables $R^1$ to $R^m$ as a function of the input variables $I^1$ to $I^n$ further comprises adding the following sum to the general equation:

$$+\sum_{v=1}^{v'} C^v(\text{product of a unique combination of 2 of } I^1 \text{ to } I^n,$$

independently selected)

wherein v' is the total number of unique combinations of any 2 of $I^1$ to $I^n$, independently selected, such that the general equation for each response variable $R^1$ to $R^m$ is:

$$R^{1-m} = C^0 + \sum_{u=1}^{u=n} C^u(I^u) + \sum_{v=1}^{v'} C^v(\text{product of}$$

a unique combination of 2 of $I^1$ to $I^n$, independently selected).

According to a seventh aspect of the present disclosure, a method according to the sixth aspect is provided, wherein the step of d) analyzing the change in each of the response variables $R^1$ to $R^m$ as a function of the input variables $I^1$ to $I^n$ further comprises adding the following sum to the general equation:

$$\sum_{w=1}^{w'} C^w(\text{product of unique combination of 3 of } I^1 \text{ to } I^n,$$

independently selected);

wherein w' is the total number of unique combinations of any 3 of $I^1$ to $I^n$, independently selected, such that the general equation for each response variable $R^1$ to $R^m$ is:

$$R^{1-m} = C^0 + \sum_{u=1}^{u=n} C^u(I^u) + \sum_{v=1}^{v'} C^v(\text{product of}$$

a unique combination of 2 of $I^1$ to $I^n$, independently selected) $+ \sum_{w=1}^{w'} C^w(\text{product of a unique}$ combination of 3 of $I^1$ to $I^n$, independently selected).

According to an eighth aspect of the present disclosure, a method according to the seventh aspect is provided, wherein the step of d) analyzing the change in each of the response variables $R^1$ to $R^m$ as a function of the input variables $I^1$ to $I^n$ further comprises adding the following sum to the general equation:

$$\sum_{x=1}^{x'}$$

$C^x$(product of a unique combination of 4 of $I^n$, independently selected)

wherein x' is the total number of unique combinations of any 4 of $I^1$ to $I^n$, independently selected, such that the general equation for each response variable $R^1$ to $R^m$ is:

$$R^{1-m} = C^0 + \sum_{u=1}^{u=n} C^u(I^u) + \sum_{v=1}^{v'} C^v(\text{product of}$$

a unique combination of 2 of $I^1$ to $I^n$, independently selected) $+ \sum_{w=1}^{w'} C^w(\text{product of}$ a unique combination of 3 of $I^1$ to $I^n$, independently selected) $+ \sum_{x=1}^{x'} C^x(\text{product of}$ a unique combination of 4 of $I^1$ to $I^n$, independently selected)

According to a ninth aspect of the present disclosure, a method according to any one of the first through eighth aspects is provided, wherein the input variables $I^1$ to $I^n$ comprise reactor temperature, reaction time, average residence time, ethylene concentration, α-olefin comonomer concentration, hydrogen concentration, catalyst type, catalyst concentration, co-catalyst concentration, activator concentration, reactor configuration, reactor volume, or any combination thereof.

According to a tenth aspect of the present disclosure, a method according to any one of the first through ninth aspects is provided, wherein the input variables $I^1$ to $I^n$ comprise feed rates to reactor for the catalyst, the cocatalyst, the activator, ethylene, α-olefin comonomer, hydrogen, reactor solvent, or any combination thereof.

According to an eleventh aspect of the present disclosure, a method according to any one of the first through tenth aspects is provided, wherein the olefin polymerization reactor system uses two or more catalysts and/or two or more co-catalysts in a single reactor, and the input variables $I^1$ to $I^n$ comprise catalyst type and catalyst concentration for each individual catalyst and/or co-catalyst type and co-catalyst concentration for each individual catalyst.

According to a twelfth aspect of the present disclosure, a method according to any one of the first through eleventh aspects is provided, wherein the olefin polymerization reactor system is a single loop dual catalyst configuration.

According to a thirteenth aspect of the present disclosure, a method according to any one of the first through eleventh aspects is provided, wherein the reactor system comprises two or more reactors in series.

According to a fourteenth aspect of the present disclosure, a method according to any one of the first through eleventh or thirteenth aspects is provided, wherein the olefin polymerization reactor system is a dual loop dual configuration, and each reactor comprising its own set of input variables $I^{1(Reactor\ 1)}$ to $I^{n(Reactor\ 1)}$, and $I^{1(Reactor\ 2)}$ to $I^{n(Reactor\ 2)}$.

According to a fifteenth aspect of the present disclosure, a method according to any one of the first through fourteenth aspects is provided, wherein the catalyst type is selected from a Ziegler-Natta catalyst, a metallocene catalyst, a Phillips catalyst, or a constrained geometry catalyst.

According to a sixteenth aspect of the present disclosure, a method according to any one of the first to fifteenth aspects is provided, wherein the molecular weight distribution (MWD) data (response variable) is [1] measured or [2] generated using the Bernoullian model.

According to a seventeenth aspect of the present disclosure, a method according to any one of the first to sixteenth aspects is provided, wherein the short chain branching (SCB) data (response variable) is [1] measured or [2] generated using the Mayo-Lewis equation.

According to an eighteenth aspect of the present disclosure, a method according to any one of the first to seventeenth aspects is provided, wherein the polyolefin product is a copolymer.

According to a nineteenth aspect of the present disclosure, a method of controlling an olefin polymerization reactor system, the method comprising: a) selecting one or more of m target response variables, $R^{t1}, R^{t2}, R^{t3}, \ldots R^{tm}$, each target response variable corresponding to a measurable polymer property; b) calculating n selected input variables $I^{s1}, I^{s2}, I^{s3}, \ldots I^{sn}$ using the Response Surface Model (RSM) of claim 1, to achieve the one or more of m target response variables, $R^{t1}, R^{t2}, R^{t3}, \ldots R^{tm}$; c) using the n selected input variables $I^{s1}$ to $I^{sn}$ to operate the olefin polymerization reactor system and provide a polyolefin product; d) measuring one or more properties of the polyolefin product corresponding to m measured response variables, $R^{m1}, R^{m2}, R^{m3}, \ldots, R^{mm}$; and e) repeating steps a) through d) to reduce the difference between the target response variables $R^{t1}$ to $R^{tm}$ and the measured response variables $R^{m1}$ to $R^{mm}$.

According to a twentieth aspect of the present disclosure, a method according to the nineteenth aspect is provided, wherein the input variables $I^1$ to $I^n$ comprise reactor temperature, reaction time, average residence time, ethylene concentration, α-olefin comonomer concentration, hydrogen concentration, catalyst type, catalyst concentration, co-catalyst concentration, activator concentration, reactor configuration, reactor volume, catalyst feed rate, co-catalyst feed rate, activator feed rate, ethylene feed rate, α-olefin comonomer feed rate, hydrogen feed rate, reactor solvent feed rate, or any combination thereof.

7According to a twenty-first aspect of the present disclosure, a method according to any one of the nineteenth or twentieth aspects is provided, wherein the olefin polymerization reactor system is a single loop dual catalyst configuration using two or more catalysts and/or two or more co-catalysts, and the input variables $I^1$ to $I^n$ comprise catalyst type and catalyst concentration for each individual catalyst and/or co-catalyst type and co-catalyst concentration for each individual catalyst.

According to a twenty-second aspect of the present disclosure, a method according to any one of the nineteenth or twentieth aspects is provided, wherein the olefin polymerization reactor system is a dual loop dual configuration, and each reactor comprising its own set of input variables $I^{1(Reactor\ 1)}$ to $I^{n(Reactor\ 1)}$, and $I^{1(Reactor\ 2)}$ to $I^{n(Reactor\ 2)}$.

According to a twenty-third aspect of the present disclosure, a method according to any one of the nineteenth to twenty-second aspects is provided, wherein the catalyst type is selected from a Ziegler-Natta catalyst, a metallocene catalyst, a Phillips catalyst, or a constrained geometry catalyst.

According to a twenty-fourth aspect of the present disclosure, a method according to any one of the nineteenth to twenty-third aspects is provided, wherein the one or more targeted resin properties comprise molecular weight distribution (MWD), short chain branching (SCB), density, PSP2, $M_w$, $M_n$, PDI, viscosity at desired shear rates (frequencies), HMLI, $I_{10}$, MI, Magnitude Slick Stick, F ratio Magnitude of slip stick, Young's Modulus, Yield Stress, Yield Strain, Natural Draw ratio, Strain Hardening Modulus, ESCR, FNCT, PENT, or NPT.

According to a twenty-fifth aspect of the present disclosure, a method according to the twenty-fourth aspect is provided, wherein the olefin polymerization reactor system produces more than one component of the olefin polymer, and the one or more targeted resin properties comprise $M_w$, $M_n$, PDI, density, and fraction for each component of the polymer.

According to a twenty-sixth aspect of the present disclosure, a method according to any one of the twenty fourth or twenty fifth aspects is provided, wherein the viscosity at desired shear rates (frequencies) comprise Eta(0.01), Eta(0.126), Eta(1.585), Eta(19.953), or Eta(251.189).

According to a twenty-seventh aspect of the present disclosure, a method according to any one of the nineteenth to twenty-sixth aspects is provided, wherein the polyolefin product is a copolymer.

What is claimed is:

1. A method of controlling a metallocene-catalyzed olefin polymerization reactor system, the method comprising:
   a) selecting n input variables $I^1, I^2, I^3, \ldots I^n$, each input variable corresponding to a process condition for a metallocene-catalyzed olefin polymerization process, wherein two of the n input variables are metallocene concentration and metallocene reactor feed rate;
   b) identifying m response variables, $R^1, R^2, R^3, \ldots R^m$, each response variable corresponding to a measurable polymer property, wherein two of the m response variables are molecular weight distribution (MWD) and short chain branching (SCB);
   c) adjusting one of more of the n input variables $I^1$ to $I^n$ in a plurality of polymerization reactions using the olefin polymerization reactor system, to provide a plurality of olefin polymers and measuring each of the m response variables $R^1$ to $R^m$ as a function of the input variables for each olefin polymer;
   d) analyzing the change in each of the response variables $R^1$ to $R^m$ as a function of the input variables $I^1$ to $I^n$ to determine the coefficients $C^0$ and $C^u$ (for u=1 to n) according to the following general equation for each response variable $R^1$ to $R^m$:

$$R^{1-m} = C^0 + \sum_{u=1}^{u=n} C^u (I^u)$$

e) calculating a Response Surface Model (RSM) using general equations for each response variable $R^1$ to $R^m$ ($R^{1-m}$) determined in step d) to correlate any combination of the n input variables $I^1$ to $I^n$ with one or more of m response variables $R^1$ to $R^m$;
   f) applying n selected input variables $I^{s1}, I^{s2}, I^{s3}, \ldots I^{sn}$ to the calculated Response Surface Model (RSM) to predict one or more of m target response variables, $R^{t1}, R^{t2}, R^{t3}, \ldots R^{tm}$, each target response variable corresponding to a measurable polymer property; and
   g) using the n selected input variables $I^{s1}$ to $I^{sn}$ to operate the olefin polymerization reactor system and provide a polyolefin product.

2. The method of claim 1, wherein the general equation for each response variable $R^1$ to $R^m$ is $$R^{1-m} = C^0 + \sum_{u=1}^{u=n} C^u (I^u) + \sum_{v=1}^{v'} C^v (\text{product of}$$

a unique combination of 2 of $I^1$ to $I^n$, independently selected)

wherein v' is the total number of unique combinations of any 2 of $I^1$ to $I^n$, independently selected.

3. The method of claim 1, wherein the general equation for each response variable $R^1$ to $R^m$ is $$R^{1-m} = C^0 + \sum_{u=1}^{u=n} C^u(I^u) + \sum_{v=1}^{v'} C^v(\text{product of a unique combination of 2 of } I^1 \text{ to } I^n, \text{ independently selected}) + \sum_{w=1}^{w'} C^w(\text{product of a unique combination of 3 of } I^1 \text{ to } I^n, \text{ independently selected})$$

wherein v' is the total number of unique combinations of any 2 of $I^1$ to $I^n$, independently selected; and w' is the total number of unique combinations of any 3 of $I^1$ to $I^n$, independently selected.

4. The method of claim 1, wherein the general equation for each response variable $R^1$ to $R^m$ is $$R^{1-m} = C^0 + \sum_{u=1}^{u=n} C^u(I^u) + \sum_{v=1}^{v'} C^v(\text{product of a unique combination of 2 of } I^1 \text{ to } I^n, \text{ independently selected}) + \sum_{w=1}^{w'} C^w(\text{product of a unique combination of 3 of } I^1 \text{ to } I^n, \text{ independently selected}) + \sum_{k=1}^{x'} C^x(\text{product of a unique combination of 4 of } I^1 \text{ to } I^n, \text{ independently selected});$$

wherein v' is the total number of unique combinations of any 2 of $I^1$ to $I^n$, independently selected; w' is the total number of unique combinations of any 3 of $I^1$ to $I^n$, independently selected; and x' is the total number of unique combinations of any 4 of $I^1$ to $I^n$, independently selected.

5. The method of claim 1, further comprising the steps of:
h) measuring one or more properties of the polyolefin product corresponding to m measured response variables, $R^{m1}$, $R^{m2}$, $R^{m3}$, ... $R^{mm}$; and
i) repeating steps a) through h) to reduce the difference between the target response variables $R^{t1}$ to $R^{tm}$ and the measured response variables $R^{m1}$ to $R^{mm}$.

6. The method of claim 1, wherein the step of d) analyzing the change in each of the response variables $R^1$ to $R^m$ as a function of the input variables $I^1$ to $I^n$ further comprises adding the following sum to the general equation:

$$+\sum_{v=1}^{v'} C^v(\text{product of a unique combination of 2 of } I^1 \text{ to } I^n, \text{ independently selected});$$

wherein v' is the total number of unique combinations of any 2 of $I^1$ to $I^n$, independently selected, such that the general equation for each response variable $R^1$ to $R^m$ is:

$$R^{1-m} = C^0 + \sum_{u=1}^{u=n} C^u(I^u) + \sum_{v=1}^{v'} C^v(\text{product of a unique combination of 2 of } I^1 \text{ to } I^n, \text{ independently selected}).$$

7. The method of claim 6, wherein the step of d) analyzing the change in each of the response variables $R^1$ to $R^m$ as a function of the input variables $I^1$ to $I^n$ further comprises adding the following sum to the general equation:

$$\sum_{w=1}^{w'} C^w(\text{product of a unique combination of 3 of } I^1 \text{ to } I^n, \text{ independently selected});$$

wherein w' is the total number of unique combinations of any 3 of $I^1$ to $I^n$, independently selected, such that the general equation for each response variable $R^1$ to $R^m$ is:

$$R^{1-m} = C^0 + \sum_{u=1}^{u=n} C^u(I^u) + \sum_{v=1}^{v'} C^v(\text{product of a unique combination of 2 of } I^1 \text{ to } I^n, \text{ independently selected}) + \sum_{w=1}^{w'} C^w(\text{product of a unique combination of 3 of } I^1 \text{ to } I^n, \text{ independently selected}).$$

8. The method of claim 7, wherein the step of d) analyzing the change in each of the response variables $R^1$ to $R^m$ as a function of the input variables $I^1$ to $I^n$ further comprises adding the following sum to the general equation:

$$\sum_{k=1}^{x'} C^x(\text{product of a unique combination of 4 of } I^1 \text{ to } I^n, \text{ independently selected});$$

wherein x' is the total number of unique combinations of any 4 of $I^1$ to $I^n$, independently selected, such that the general equation for each response variable $R^1$ to $R^m$ is:

$$R^{1-m} = C^0 + \sum_{u=1}^{u=n} C^u(I^u) + \sum_{v=1}^{v'} C^v(\text{product of a unique combination of 2 of } I^1 \text{ to } I^n, \text{ independently selected}) + \sum_{w=1}^{w'} C^w(\text{product of a unique combination of 3 of } I^1 \text{ to } I^n, \text{ independently selected}) + \sum_{k=1}^{x'} C^x(\text{product of a unique combination of 4 of } I^1 \text{ to } I^n, \text{ independently selected}).$$

9. The method of claim 1, wherein the input variables $I^1$ to $I^n$ comprise reactor temperature, reaction time, average residence time, ethylene concentration, α-olefin comonomer concentration, hydrogen concentration, co-catalyst concentration, activator concentration, reactor configuration, reactor volume, or any combination thereof.

10. The method of claim 1, wherein the input variables $I^1$ to $I^n$ comprise feed rates to reactor for the cocatalyst, the activator, ethylene, α-olefin comonomer, hydrogen, reactor solvent, or any combination thereof.

11. The method of claim 1, wherein the olefin polymerization reactor system uses two or more catalysts and/or two or more co-catalysts in a single reactor, and the input variables $I^1$ to $I^n$ comprise catalyst type and catalyst concentration for each individual catalyst and/or co-catalyst type and co-catalyst concentration for each individual catalyst.

12. The method of claim 1, wherein the molecular weight distribution (MWD) data (response variable) is [1] measured or [2] generated using the Bernoullian model.

13. The method of claim 1, wherein the short chain branching (SCB) data (response variable) is [1] measured or [2] generated using the Mayo-Lewis equation.

14. The method of claim 1, wherein the polyolefin product is a copolymer.

15. A method of controlling a metallocene-catalyzed olefin polymerization reactor system, the method comprising:
   a) selecting one or more of m target response variables, $R^{t1}, R^{t2}, R^{t3}, \ldots R^{tm}$, each target response variable corresponding to a measurable polymer property;
   b) calculating n selected input variables $I^{s1}, I^{s2}, I^{s3}, \ldots I^{sn}$ using the calculated Response Surface Model (RSM) of claim 1, to achieve the one or more of m target response variables, $R^{t1}, R^{t2}, R^{t3}, \ldots R^{tm}$;
   c) using the n selected input variables $I^{s1}$ to $I^{sn}$ to operate the metallocene-catalyzed olefin polymerization reactor system and provide a polyolefin product;
   d) measuring one or more properties of the polyolefin product corresponding to m measured response variables, $R^{m1}, R^{m2}, R^{m3}, \ldots R^{mm}$; and
   e) repeating steps a) through d) to reduce the difference between the target response variables $R^{t1}$ to $R^{tm}$ and the measured response variables $R^{m1}$ to $R^{mm}$.

16. The method of claim 15, wherein the input variables $I^1$ to $I^n$ comprise reactor temperature, reaction time, average residence time, ethylene concentration, α-olefin comonomer concentration, hydrogen concentration, co-catalyst concentration, activator concentration, reactor configuration, reactor volume, co-catalyst feed rate, activator feed rate, ethylene feed rate, α-olefin comonomer feed rate, hydrogen feed rate, reactor solvent feed rate, or any combination thereof.

17. The method of claim 15, wherein the olefin polymerization reactor system uses two or more catalysts and/or two or more co-catalysts, and the input variables $I^1$ to $I^n$ comprise catalyst type and catalyst concentration for each individual catalyst and/or co-catalyst type and co-catalyst concentration for each individual catalyst.

18. The method of claim 15, wherein the one or more targeted polyolefin product properties comprise molecular weight distribution (MWD), short chain branching (SCB), density, PSP2, $M_w$, $M_n$, PDI, viscosity at desired shear rates (frequencies), HMLI, $I_{10}$, MI, Magnitude Slick Stick, F ratio Magnitude of slip stick, Young's Modulus, Yield Stress, Yield Strain, Natural Draw ratio, Strain Hardening Modulus, ESCR, FNCT, PENT, or NPT.

19. The method of claim 18, wherein the olefin polymerization reactor system produces more than one component of the olefin polymer, and the one or more targeted resin properties comprise $M_w$, $M_n$, PDI, density, and fraction for each component of the polymer.

20. The method of claim 19, wherein the polyolefin product is a copolymer.

21. A method of controlling a dual loop olefin polymerization reactor system, the method comprising:
   a) selecting n input variables $I^1, I^2, I^3, \ldots I^n$, each input variable corresponding to a process condition for an olefin polymerization process, wherein six of the n input variables are hydrogen concentration, α-olefin comonomer concentration, ethylene concentration, hydrogen reactor feed rate, α-olefin comonomer reactor feed rate, and ethylene reactor feed rate;
   b) identifying m response variables, $R^1, R^2, R^3, \ldots R^m$, each response variable corresponding to a measurable polymer property, wherein two of the m response variables are molecular weight distribution (MWD) and short chain branching (SCB);
   c) adjusting one of more of the n input variables $I^1$ to $I^n$ in a plurality of polymerization reactions using the olefin polymerization reactor system, to provide a plurality of olefin polymers and measuring each of the m response variables $R^1$ to $R^m$ as a function of the input variables for each olefin polymer;
   d) analyzing the change in each of the response variables $R^1$ to $R^m$ as a function of the input variables $I^1$ to $I^n$ to determine the coefficients $C^0$ and $C^u$ (for u=1 to n) according to the following general equation for each response variable $R^1$ to $R^m$:

$$R^{1-m} = C^0 + \sum_{u=1}^{u=n} C^u(I^u)$$

e) calculating a Response Surface Model (RSM) using general equations for each response variable $R^1$ to $R^m$ ($R^{1-m}$) determined in step d) to correlate any combination of the n input variables $I^1$ to $I^n$ with one or more of m response variables $R^1$ to $R^m$;
   f) applying n selected input variables $I^{s1}, I^{s2}, I^{s3}, \ldots I^{sn}$ to the calculated Response Surface Model (RSM) to predict one or more of m target response variables, $R^{t1}, R^{t2}, R^{t3}, \ldots R^{tm}$, each target response variable corresponding to a measurable polymer property; and
   g) using the n selected input variables $I^{s1}$ to $I^{sn}$ to operate the olefin polymerization reactor system and provide a polyolefin product.

22. The method of claim 21, wherein the general equation for each response variable $R^1$ to $R^m$ is $$R^{1-m} = C^0 + \sum_{u=1}^{u=n} C^u(I^u) + \sum_{v=1}^{v'} C^v (\text{product of a unique combination of 2 of } I^1 \text{ to } I^n, \text{ independently selected})$$

wherein v' is the total number of unique combinations of any 2 of $I^1$ to $I^n$, independently selected.

23. The method of claim 21, wherein the general equation for each response variable $R^1$ to $R^m$ is $$R^{1-m} = C^0 + \sum_{u=1}^{u=n} C^u(I^u) + \sum_{v=1}^{v'} C^v (\text{product of a unique combination of 2 of } I^1 \text{ to } I^n, \text{ independently selected}) + \sum_{w=1}^{w'} C^w (\text{product of a unique combination of 3 of } I^1 \text{ to } I^n, \text{ independently selected})$$

wherein v' is the total number of unique combinations of any 2 of $I^1$ to $I^n$, independently selected; and w' is the total number of unique combinations of any 3 of $I^1$ to $I^n$, independently selected.

24. The method of claim 21, wherein the general equation for each response variable $R^1$ to $R^m$ is $$R^{1-m} = C^0 + \sum_{u=1}^{u=n} C^u(I^u) +$$

$$\sum_{k=1}^{v'} C^v(\text{product of a unique combination of 2 of } I^1 \text{ to } I^n,$$

independently selected) +

$$\sum_{k=1}^{w'} C^w(\text{product of a unique combination of 3 of } I^1 \text{ to } I^n,$$

independently selected) +

$$\sum_{k=1}^{x'} C^x(\text{product of a unique combination of 4 of } I^1 \text{ to } I^n,$$

independently selected).

wherein v′ is the total number of unique combinations of any 2 of $I^1$ to $I^n$, independently selected; w′ is the total number of unique combinations of any 3 of $I^1$ to $I^n$, independently selected; and x′ is the total number of unique combinations of any 4 of $I^1$ to $I^n$, independently selected.

25. The method of claim 21, further comprising the steps of:
h) measuring one or more properties of the polyolefin product corresponding to m measured response variables, $R^{m1}$, $R^{m2}$, $R^{m3}$, ... $R^{mm}$; and
i) repeating steps a) through h) to reduce the difference between the target response variables $R^{t1}$ to $R^{tm}$ and the measured response variables $R^{m1}$ to $R^{mm}$.

26. The method of claim 21, wherein the step of d) analyzing the change in each of the response variables $R^1$ to $R^m$ as a function of the input variables $I^1$ to $I^n$ further comprises adding the following sum to the general equation:

$$+\sum_{k=1}^{v'} C^v(\text{product of a unique combination of 2 of } I^1 \text{ to } I^n,$$

independently selected);

wherein v′ is the total number of unique combinations of any 2 of $I^1$ to $I^n$, independently selected, such that the general equation for each response variable $R^1$ to $R^m$ is:

$$R^{1-m} = C^0 + \sum_{u=1}^{u=n} C^u(I^u) +$$

$$\sum_{k=1}^{v'} C^v(\text{product of a unique combination of 2 of } I^1 \text{ to } I^n,$$

independently selected).

27. The method of claim 26, wherein the step of d) analyzing the change in each of the response variables $R^1$ to $R^m$ as a function of the input variables $I^1$ to $I^n$ further comprises adding the following sum to the general equation:

$$\sum_{k=1}^{w'} C^w(\text{product of a unique combination of 3 of } I^1 \text{ to } I^n,$$

independently selected);

wherein w′ is the total number of unique combinations of any 3 of $I^1$ to $I^n$, independently selected, such that the general equation for each response variable $R^1$ to $R^m$ is:

$$R^{1-m} = C^0 + \sum_{u=1}^{u=n} C^u(I^u) +$$

$$\sum_{k=1}^{v'} C^v(\text{product of a unique combination of 2 of } I^1 \text{ to } I^n,$$

independently selected) +

$$\sum_{k=1}^{w'} C^w(\text{product of a unique combination of 3 of } I^1 \text{ to } I^n,$$

independently selected).

28. The method of claim 27, wherein the step of d) analyzing the change in each of the response variables $R^1$ to $R^m$ as a function of the input variables $I^1$ to $I^n$ further comprises adding the following sum to the general equation:

$$\sum_{k=1}^{x'} C^x(\text{product of a unique combination of 4 of } I^1 \text{ to } I^n,$$

independently selected);

wherein x′ is the total number of unique combinations of any 4 of $I^1$ to $I^n$, independently selected, such that the general equation for each response variable $R^1$ to $R^m$ is:

$$R^{1-m} = C^0 + \sum_{u=1}^{u=n} C^u(I^u) +$$

$$\sum_{k=1}^{v'} C^v(\text{product of a unique combination of 2 of } I^1 \text{ to } I^n,$$

independently selected) +

$$\sum_{k=1}^{w'} C^w(\text{product of a unique combination of 3 of } I^1 \text{ to } I^n,$$

independently selected) +

$$\sum_{k=1}^{x'} C^x(\text{product of a unique combination of 4 of } I^1 \text{ to } I^n,$$

independently selected).

29. The method of claim 21, wherein the input variables $I^1$ to $I^n$ comprise reactor temperature, reaction time, average residence time, catalyst type, catalyst concentration, cocatalyst concentration, activator concentration, reactor configuration, reactor volume, or any combination thereof.

30. The method of claim 21, wherein the input variables $I^1$ to $I^n$ comprise feed rates to reactor for the catalyst, the cocatalyst, the activator, reactor solvent, or any combination thereof.

31. The method of claim 21, wherein the reactor system comprises two reactors in series.

32. The method of claim 21, wherein the reactor system is a dual loop dual configuration system, wherein each reactor comprises a respective set of input variables $I^{1(Reactor\ 1)}$ to $I^{n(Reactor\ 1)}$ and $I^{1(Reactor\ 2)}$ to $I^{n(Reactor\ 2)}$.

33. The method of claim 29, wherein the catalyst type is selected from a Ziegler-Natta catalyst, a metallocene catalyst, a Phillips catalyst, or a constrained geometry catalyst.

34. The method of claim 21, wherein the molecular weight distribution (MWD) data (response variable) is [1] measured or [2] generated using the Bernoullian model.

35. The method of claim 21, wherein the short chain branching (SCB) data (response variable) is [1] measured or [2] generated using the Mayo-Lewis equation.

36. The method of claim 21, wherein the polyolefin product is a copolymer.

37. A method of controlling a dual loop olefin polymerization reactor system, the method comprising:
  a) selecting one or more of m target response variables, $R^{t1}, R^{t2}, R^{t3}, \ldots R^{tm}$, each target response variable corresponding to a measurable polymer property;
  b) calculating n selected input variables $I^{s1}, I^{s2}, I^{s3}, \ldots I^{sn}$ using the calculated Response Surface Model (RSM) of claim 21, to achieve the one or more of m target response variables, $R^{t1}, R^{t2}, R^{t3}, \ldots R^{tm}$;
  c) using the n selected input variables $I^{s1}$ to $I^{sn}$ to operate the olefin polymerization reactor system and provide a polyolefin product;
  d) measuring one or more properties of the polyolefin product corresponding to m measured response variables, $R^{m1}, R^{m2}, R^{m3}, \ldots R^{mm}$; and
  e) repeating steps a) through d) to reduce the difference between the target response variables $R^{t1}$ to $R^{tm}$ and the measured response variables $R^{m1}$ to $R^{mm}$.

38. The method of claim 37, wherein the input variables $I^1$ to $I^n$ comprise reactor temperature, reaction time, average residence time, catalyst type, catalyst concentration, co-catalyst concentration, activator concentration, reactor configuration, reactor volume, catalyst feed rate, co-catalyst feed rate, activator feed rate, reactor solvent feed rate, or any combination thereof.

39. The method of claim 37, wherein the reactor system is a dual loop dual configuration system, and each reactor comprising a respective set of input variables $I^{1(Reactor\ 1)}$ to $I^{n(Reactor\ 1)}$, and $I^{1(Reactor\ 2)}$ to $I^{n(Reactor\ 2)}$.

40. The method of claim 39, wherein the catalyst type is selected from a Ziegler-Natta catalyst, a metallocene catalyst, a Phillips catalyst, or a constrained geometry catalyst.

41. The method of claim 37, wherein the one or more targeted resin properties comprise molecular weight distribution (MWD), short chain branching (SCB), density, PSP2, $M_w$, $M_n$, PDI, viscosity at desired shear rates (frequencies), HMLI, $I_{10}$, MI, Magnitude Slick Stick, F ratio Magnitude of slip stick, Young's Modulus, Yield Stress, Yield Strain, Natural Draw ratio, Strain Hardening Modulus, ESCR, FNCT, PENT, or NPT.

42. The method of claim 41, wherein the olefin polymerization reactor system produces more than one component of the olefin polymer, and the one or more targeted resin properties comprise $M_w$, $M_n$, PDI, density, and fraction for each component of the polymer.

43. The method of claim 41, wherein the viscosity at desired shear rates (frequencies) comprise Eta(0.01), Eta(0.126), Eta(1.585), Eta(19.953), or Eta(251.189).

44. The method of claim 37, wherein the polyolefin product is a copolymer.

* * * * *